US012666166B2

(12) United States Patent
Park

(10) Patent No.: US 12,666,166 B2
(45) Date of Patent: Jun. 23, 2026

(54) ELECTRONIC DEVICE AND METHOD FOR CONTROLLING SAME

(71) Applicant: Samsung Electronics Co., Ltd., Suwon-si (KR)

(72) Inventor: Jaehyoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 18/599,746

(22) Filed: Mar. 8, 2024

(65) Prior Publication Data

US 2024/0214698 A1     Jun. 27, 2024

Related U.S. Application Data

(63) Continuation of application No. PCT/KR2022/013524, filed on Sep. 8, 2022.

(30) Foreign Application Priority Data

Sep. 9, 2021    (KR) ........................ 10-2021-0120617

(51) Int. Cl.
*H04N 25/11*         (2023.01)
*H04N 23/55*         (2023.01)
*H04N 23/56*         (2023.01)

(52) U.S. Cl.
CPC ............. *H04N 25/11* (2023.01); *H04N 23/55* (2023.01); *H04N 23/56* (2023.01)

(58) Field of Classification Search
CPC ...... H04N 23/55; H04N 23/56; H04N 23/957; H04N 25/11; H04N 25/134; H04N 25/704; H10F 39/8053; H10F 39/8063
See application file for complete search history.

(56) References Cited

U.S. PATENT DOCUMENTS

| | | |
|---|---|---|
| 10,547,800 B2 | 1/2020 | Hwang et al. |
| 2012/0268634 A1 | 10/2012 | Fukuda et al. |

(Continued)

FOREIGN PATENT DOCUMENTS

| | | |
|---|---|---|
| CN | 104241310 A | 12/2014 |
| KR | 10-0781552 B1 | 12/2007 |

(Continued)

OTHER PUBLICATIONS

International Search Report dated Dec. 23, 2022, issued in International Application No. PCT/KR2022/013524.

(Continued)

*Primary Examiner* — Amy R Hsu
(74) *Attorney, Agent, or Firm* — Jefferson IP Law, LLP

(57)     ABSTRACT

An electronic device including at least one camera module and a method for controlling the same are provided. The electronic device includes a lens portion, an image sensor configured to covert light passing through the lens portion into a digital signal, and a data computation portion, wherein the image sensor includes a micro lens array portion including a plurality of micro lenses regularly-arranged and configured to focus at least a portion of the light on a specific light receiving element, color filter array portion including one or more types of multiple colors spatially separated and capable of selectively transmitting the light, and a light receiving portion including a plurality of light receiving elements converting incident light, selectively incident from the color filter array portion, into an electrical signal, wherein one micro lens corresponds to one color filter, and the one micro lens corresponds to a plurality of sub-light receiving portions including at least three light receiving elements, wherein the plurality of sub-light receiving portions include a first sub-light receiving portion receiving a first light of the incident light, a second sub-light receiving (Continued)

portion disposed side by side with the first sub-light receiving portion in a first direction and receiving a second light adjacent to the first light of the incident light, and a third sub-light receiving portion disposed in a direction opposite the first direction with respect to the first sub-light receiving portion and receiving a third light adjacent to the first light of the incident light.

17 Claims, 17 Drawing Sheets

(56) References Cited

U.S. PATENT DOCUMENTS

| | | | |
|---|---|---|---|
| 2014/0009634 A1 | 1/2014 | Hiwada et al. | |
| 2015/0015773 A1 | 1/2015 | Tulyakov et al. | |
| 2016/0255289 A1 | 9/2016 | Johnson et al. | |
| 2017/0090149 A1 | 3/2017 | Galor Gluskin et al. | |
| 2017/0094210 A1 | 3/2017 | Galor Gluskin | |
| 2017/0330348 A1 | 11/2017 | Park et al. | |
| 2017/0338258 A1* | 11/2017 | Kim | H10F 39/813 |
| 2017/0347042 A1 | 11/2017 | Borthakur et al. | |
| 2017/0359522 A1 | 12/2017 | Park et al. | |
| 2017/0373105 A1* | 12/2017 | Galor Gluskin | H04N 23/67 |
| 2018/0026065 A1 | 1/2018 | Hsieh et al. | |
| 2020/0007799 A1* | 1/2020 | Tanaka | H04N 25/671 |
| 2020/0314362 A1* | 10/2020 | Roh | H04N 25/46 |
| 2020/0358989 A1 | 11/2020 | Hoshino | |
| 2021/0175270 A1 | 6/2021 | Pang et al. | |
| 2021/0203872 A1 | 7/2021 | Chen et al. | |
| 2021/0211615 A1 | 7/2021 | Kim et al. | |
| 2022/0116545 A1* | 4/2022 | Feng | G03B 13/30 |

FOREIGN PATENT DOCUMENTS

| | | |
|---|---|---|
| KR | 10-2015-0006755 A | 1/2015 |
| KR | 10-2015-0124367 A | 11/2015 |
| KR | 10-2017-0127638 A | 11/2017 |
| KR | 10-2017-0139798 A | 12/2017 |
| KR | 10-2018-0059842 A | 6/2018 |
| KR | 10-2020-0113484 A | 10/2020 |

OTHER PUBLICATIONS

European Search Report dated Nov. 5, 2024, issued in European Application No. 22867727.4.
Korean Office Action dated Dec. 31, 2025, issued in Korean Application No. 10-2021-0120617.

* cited by examiner

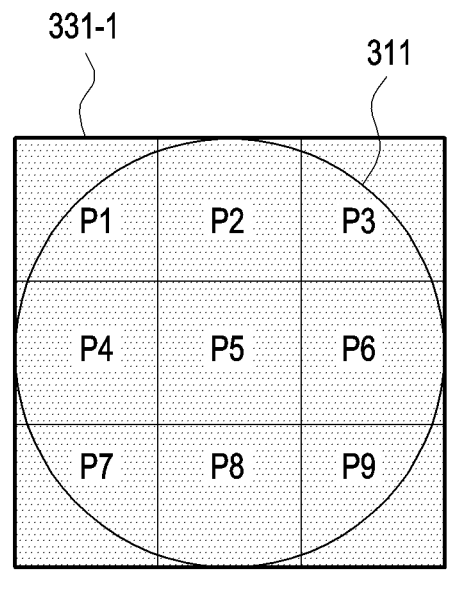
FIG. 16A
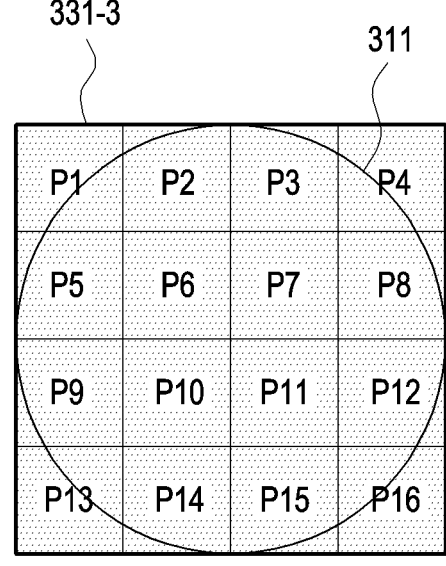
FIG. 16C
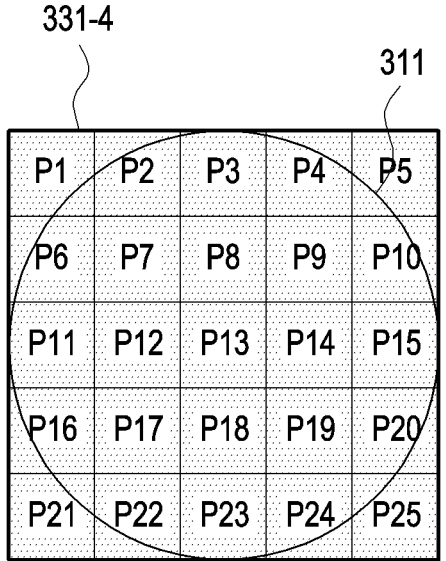
FIG. 16B
FIG. 16D

ELECTRONIC DEVICE AND METHOD FOR CONTROLLING SAME

CROSS-REFERENCE TO RELATED APPLICATION(S)

This application is a continuation application, claiming priority under § 365(c), of an International application No. PCT/KR2022/013524, filed on Sep. 8, 2022, which is based on and claims the benefit of a Korean patent application number 10-2021-0120617, filed on Sep. 9, 2021, in the Korean Intellectual Property Office, the disclosure of which is incorporated by reference herein in its entirety.

BACKGROUND

1. Field

The disclosure relates to an electronic device capturing an object and a method for controlling the same.

2. Description of Related Art

Light field technology is widely known, which constructs an image by individually splitting each light bundle of incident light that enters a lens from a camera. According to light field technology, it is possible to separately store intensity information about the light passing through a main lens constituting a camera by placing a separate micro lens from the main lens in front of an image sensor.

According to an embodiment of the disclosure, a phase defect (auto focusing (AF)) which splits a phase image and focuses according to incident light may be implemented using the light field technology. While this technique of separating the incident light intensity information by direction may be useful, the process of incorporating a micro lens into an image sensor is limited in its miniaturization, which means that some of the picture elements (or light receiving elements) in the image sensor may not be used for image output, resulting in outputting an image with a lower resolution than the number of pixels in the image sensor. To address this, proposed is remosaic technology for using all picture elements in an image sensor in outputting an image as possible.

The above information is presented as background information only to assist with an understanding of the disclosure. No determination has been made, and no assertion is made, as to whether any of the above might be applicable as prior art with regard to the disclosure.

SUMMARY

Remosaic refers to a task for outputting electrical data about light as an image that the user may view. The remosaic technology may apply to embodiments in which a plurality of light receiving elements are arranged in each micro lens, as well as embodiments in which one light receiving element (e.g., photodiode) is disposed in each micro lens. For example, it is possible to implement 'resolution restoration' which composes N×M light receiving elements (e.g., N×M photodiodes) in one micro lens using remosaic technology and outputs a bayer-type image using remosaic technology. According to an embodiment of the disclosure, a remosaic technology for outputting a high-resolution image using all of the light receiving elements included in an electronic device may be referred to as 'high-resolution image output.'

In technology for placing a plurality of light receiving elements (e.g., photodiodes) in each micro lens, the phase difference between the plurality of light receiving elements may easily be detected by splitting a light bundle by the micro lens. However, the phase difference caused due to the micro lens may be disadvantageous in remosaic. For example, data having different phases are formed at the boundary between the plurality of light receiving elements when the light bundle is split due to one micro lens. Thus, artifacts may occur during the remosaic process, which may have a negative influence on increasing the resolving power. As such, when the degree of separation of the light bundle by the micro lens is represented as a 'high separation ratio or low separation ratio,' the high-separation ratio may be advantageous in phase difference computation (e.g., auto focusing (AF) but disadvantageous in image output (or resolution restoration) according to remosaic. In contrast, the low-separation ratio is disadvantageous in phase difference computation but may be advantageous in image output (resolution restoration) according to remosaic. Conventionally, there is no technology proposed as being advantageous in both phase difference computation and image output, and it is generally known that when a plurality of light receiving elements are included for a micro lens, phase difference computation and image output are in a trade-off relation.

Aspects of the disclosure are to address at least the above-mentioned problems and/or disadvantages and to provide at least the advantages described below. Accordingly, an aspect of the disclosure is to provide an electronic device advantageous for both phase difference computation and image output (resolution restoration) according to remosaic in a technology for placing a plurality of light receiving elements for each micro lens and a method for controlling the same.

Additional aspects will be set forth in part in the description which follows and, in part, will be apparent from the description, or may be learned by practice of the presented embodiments.

In accordance with an aspect of the disclosure, an electronic device including at least one camera module is provided. The electronic device includes a lens portion, an image sensor configured to convert light passing through the lens portion into a digital signal, and a data computation portion, wherein the image sensor includes a micro lens array portion including a plurality of micro lenses regularly arranged configured to focus at least a portion of the light on a specific light receiving element, a color filter array portion including one or more types of multiple colors spatially separated and capable of selectively transmitting the light, and a light receiving portion including a plurality of light receiving elements converting incident light, selectively incident from the color filter array portion, into an electrical signal, wherein one micro lens corresponds to one color filter, and the one micro lens corresponds to a plurality of sub light receiving portions including at least three light receiving elements, and wherein the plurality of sub light receiving portions include a first sub light receiving portion receiving a first light of incident light, a second sub light receiving portion disposed side by side with the first sub light receiving portion in a first direction and receiving a second light adjacent to the first light of the incident light, and a third sub light receiving portion disposed in a direction opposite to the first direction with respect to the first sub light receiving portion and receiving a third light adjacent to the first light of the incident light.

In accordance with another aspect of the disclosure, a method for controlling an electronic device including a camera module including an image sensor including a main lens and a plurality of micro lenses and a plurality of light receiving elements and a data computation portion is provided The method includes performing computation using electrical data for a surrounding element of a central element among the plurality of light receiving elements except for electrical data for the central element, at a request for detecting a phase difference, and performing computation using a synthesized value of the electrical data for the central element among the plurality of light receiving elements and the electrical data for the surrounding element among the plurality of light receiving elements, at a request for outputting an image.

In accordance with another aspect of the disclosure, an electronic device is provided The electronic device includes at least one camera module, a lens portion, an image sensor including a plurality of pixels and capable of converting light passing through the lens portion into a digital signal, and a data computation portion, wherein at least one of the plurality of pixels includes a micro lens, a color filter, a first light receiving element receiving a first light of incident light, a second light receiving element disposed side by side with the first light receiving element in a first direction and receiving a second light adjacent to the first light of the incident light, and a third light receiving element disposed in a direction opposite to the first direction with respect to the first light receiving element and receiving a third light adjacent to the first light of the incident light.

In accordance with another aspect of the disclosure, an electronic device and a control method advantageous for both phase difference AF computation and image output (resolution separation) according to remosaic are provided. For example, an electronic device and a control method capable of implementing better resolving power in remosaic operation are provided. As another example, it is possible to prevent degradation of AF performance in implementing better resolving power in remosaic operation.

In accordance with another aspect of the disclosure, one or more non-transitory computer-readable storage media storing computer-executable instructions that, when executed by one or more processors of an electronic device, cause the electronic device to perform operations are provided. The operations include performing computation using electrical data for a surrounding element of a central element among a plurality of light receiving elements except for electrical data for the central element, at a request for detecting a phase difference, and performing computation using a synthesized value of the electrical data for the central element among the plurality of light receiving elements and the electrical data for the surrounding element among the plurality of light receiving elements, at a request for outputting an image.

Further, according to various embodiments of the disclosure, it is possible to provide an extended depth of field (EDof)-type application and diaphragm effects and to implement a user interface (UI) in the known program, aperture priority, shutter priority, and manual (PASM) exposure mode form even in a diaphragm-free camera module.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 16A, 16B, 16C, and 16D illustrate an image sensor including a plurality of sub light receiving portions according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
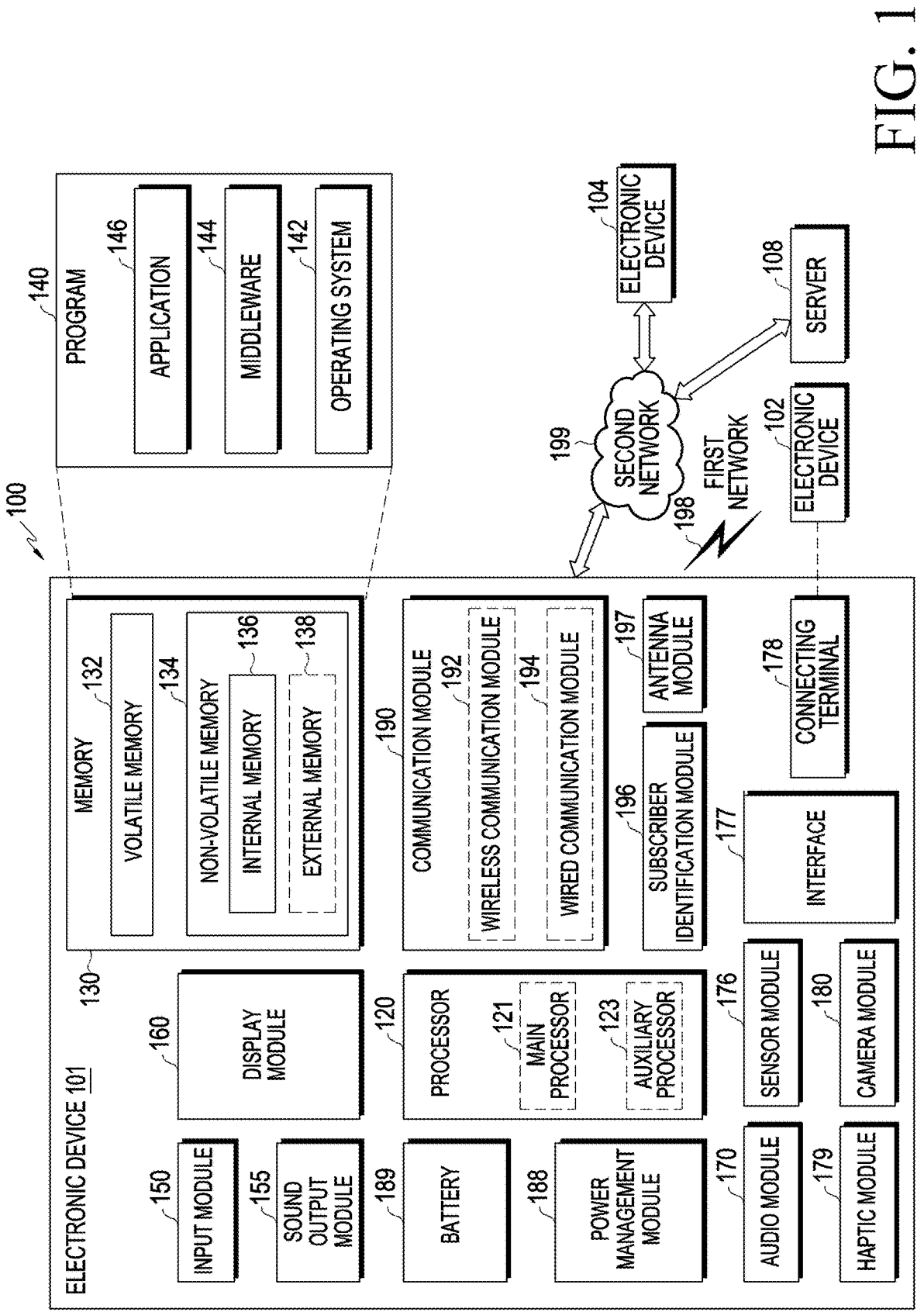
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or the external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal According to an embodiment of the disclosure, the display module 160 may include a first display module 351 corresponding to the user's left eye and/or a second display module 353 corresponding to the user's right eye, a haptic module 179, a camera module 180, a power management module 188, a battery 189, a communication module 190, a subscriber identification module (SIM) 196, or an antenna module 197. In an embodiment of the disclosure, at least one (e.g., a connecting terminal 178) of the components may be omitted from the electronic device 101, or one or more other components may be added in the electronic device 101. According to an embodiment of the disclosure, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor configured to detect a touch, or a pressure sensor configured to measure the intensity of a force generated by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image capturing elements (image sensors), image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips)

separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device). According to an embodiment of the disclosure, the antenna module 197 may include one antenna including a radiator formed of a conductive body or conductive pattern formed on a substrate (e.g., a printed circuit board (PCB)). According to an embodiment of the disclosure, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment of the disclosure, other parts (e.g., radio frequency integrated circuit (RFIC)) than the radiator may be further formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an Internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
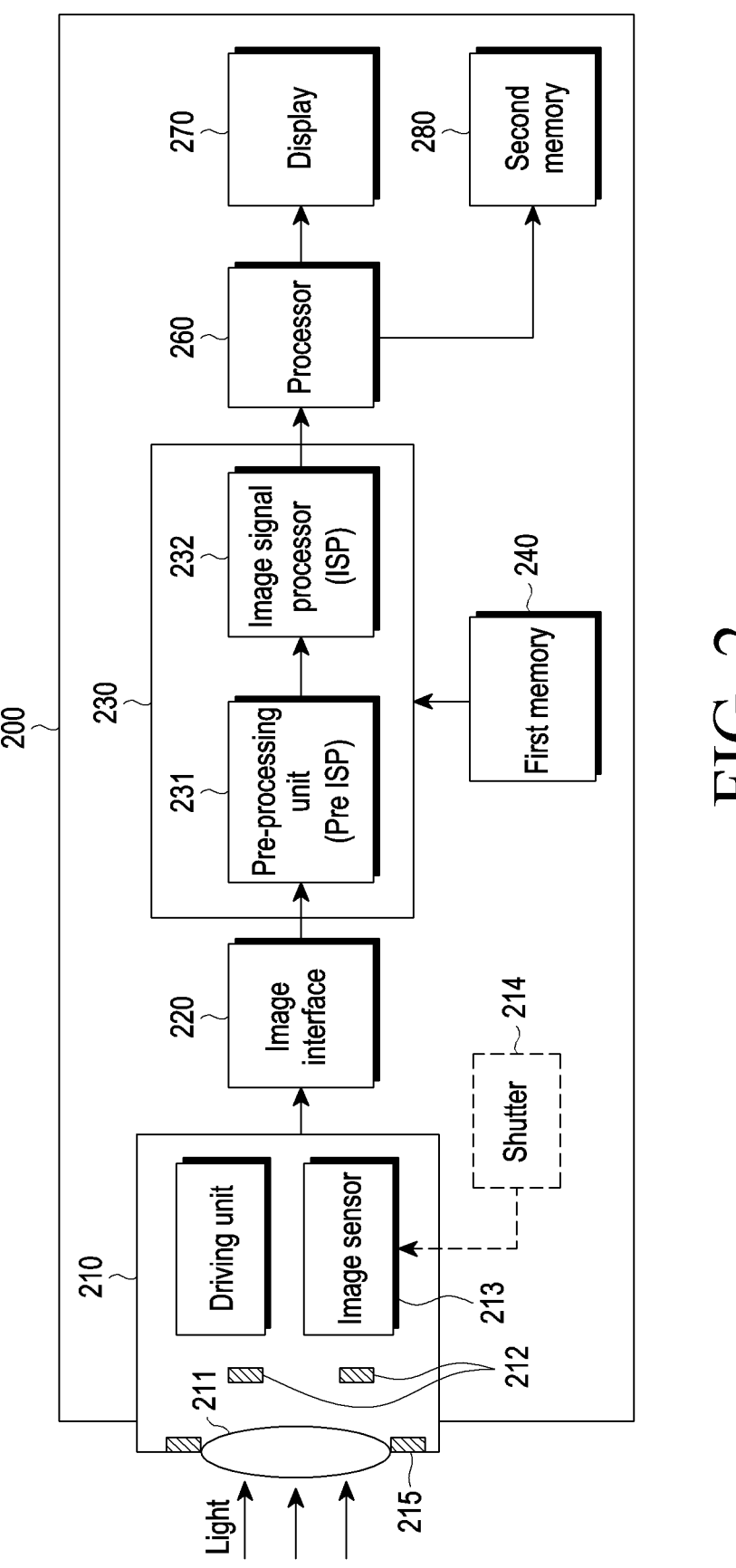
FIG. 2 is a block diagram illustrating components of an electronic device according to an embodiment of the disclosure.

FIG. 2 is a block diagram illustrating components of an electronic device according to an embodiment of the disclosure.

Referring to FIG. 2, according to an embodiment of the disclosure, an electronic device 200 (e.g., a camera) may collect the light reflected by a subject and capture a photo (or video). The electronic device 200 may include an image capture unit 210, an interface 220, an image processing unit 230, first memory 240, a processor 260, a display 270, and second memory 280. According to various embodiments of the disclosure, the image capture unit 210 may constitute a camera (e.g., the camera module 180 of FIG. 1). An image signal processor 232 and the processor 260 may constitute at least one processor (e.g., the processor 120 of FIG. 1).

The image capture unit 210 may include a lens portion 211, a diaphragm 212, an imaging device 213 (hereinafter referred to as an 'image sensor 213'), a shutter 214, and drivers 215 and 216.

The lens portion 211 may collect light reflected from the subject and reaching the electronic device 200. The lens portion 211 may include at least one lens, and for example, may be implemented as a lens assembly in which a plurality of lenses are aligned in an optical axis direction. In this case, the image capture unit 210 may be, e.g., a dual-camera, a 360-degree camera, or a spherical camera. The lenses included in the lens assembly may have the same lens attributes (e.g., angle of view, focal length, auto-focus, f-number, or optical zoom), or at least one lens may have at least one different lens attribute than another lens. The lens assembly may include, for example, a wide-angle lens or a telephoto lens. The amount of light (light quantity) collected through the lens portion 211 may be adjusted through the diaphragm 212, and that light that has passed through the diaphragm 212 may reach the image sensor 213. In the embodiment shown in FIG. 2, the diaphragm 212 is illustrated as separated from the lens portion 211. Alternatively, the diaphragm 212 may be integrated into the lens portion 211.

The image sensor 213 may include a pixel array in which a plurality of image pixels are two-dimensionally arranged in a grid shape. One of a plurality of reference colors may be allocated to each of the plurality of image pixels. According to various embodiments of the disclosure, the plurality of reference colors may include, e.g., red-green-blue (RGB), red-green-blue-white (RGBW), cyan-magenta-yellow (CMY), cyan-magenta-yellow-black (CMYK), red-yellow-blue (RYB), and infrared ray (RGBIR). A plurality of micro lenses may be disposed on a side closer to the subject in the optical axis direction with respect to the plurality of image pixels. The image sensor 213 may generate a digital signal (or an electrical signal) based on the light reflected from the subject and may generate digital image data (hereinafter, simply referred to as 'image data') based on the electrical signal. The image sensor 213 may include one selected from image sensors having different attributes, such as a RGB sensor, a black-and-white (BW) sensor, an IR sensor, or a UV sensor, a plurality of image sensors having the same attribute, or a plurality of image sensors having different attributes. As the image sensor 213, e.g., a charged coupled device (CCD) sensor or a complementary metal oxide semiconductor (CMOS) sensor may be used.

According to various embodiments of the disclosure, the image sensor 213 may include a photodiode PD, a transfer transistor TX (or transfer gate), a reset transistor RX (or reset gate), and a floating diffusion node FD. The photodiode PD may generate and accumulate photocharges corresponding to the optical image of the subject. The transfer transistor TX may transmit the photocharges focused on the photodiode PD to the floating diffusion node FD in response to a transmission signal. The reset transistor RX may discharge the charges stored in the floating diffusion node FD in response to a reset signal. Charges stored in the floating diffusion node FD are output before the reset signal is applied. In this case, correlated double sampling (CDS) may be performed, and the CDSed analog signal may be converted into a digital signal through an analog-to-digital circuit (ADC) and/or an analog front end (AFE). As an example, the image sensor 213 of the disclosure may include four photodiodes in a pixel corresponding to one microlens (e.g., a 4PD pixel).

The shutter 214 may adjust the time during which the image sensor 213 is exposed to light. For example, when the shutter 214 operates slowly, more light may be incident on the image sensor 213 and, when the shutter 214 operates quickly, less light may be incident on the image sensor 213.

The drivers 215 and 216 may be components for adjusting the position of the lens portion 211, the diaphragm 212, or the image sensor 214. The drivers 215 and 216 may include a first driver 215 and a second driver 216. For example, the first driver 215 may move the lens portion 211 or the diaphragm 212 in parallel to the optical axis direction. By implementing an auto focusing (AF) operation of the image capture unit 210 through the first driver 215, the focus of the light imaged on the image sensor 213 may be adjusted. Further, for example, the second driver 216 may adjust the position of the lens portion 211 or the image sensor 214, preventing a shake that occurs when the user manipulates the image capture unit 210. The second driver 216 may move in a particular direction, or control (e.g., adjust the read-out timing of), the image sensor 213 or at least one lens included in the lens assembly to at least partially compensate for a negative effect (e.g., image blurring) on a captured image, which is caused by the motion of the image capture unit 210 or the electronic device 200 including the image capture unit 210, in response to the motion. According to an embodiment of the disclosure, the second driver may be implemented as, e.g., an image stabilizer or an optical image stabilizer and may detect the movement using a gyro sensor (not shown) or an acceleration sensor (not shown) disposed inside or outside the image capture unit 210.

The interface 220 may be disposed between the image sensor 213 and the image processing unit 230 to perform interfacing. The data output from the image sensor 213 through the interface 220 may be transmitted to the image processing unit 230. Depending on the configuration of the electronic device 200, the interface 220 may be included in the image processing unit 230. Further, depending on the configuration of the electronic device 200, the interface 220 may be omitted or another interface not shown in the drawings may be additionally provided.

The first and second memories 240 and 280 may at least temporarily store, e.g., at least a portion of the image obtained through the image sensor 213 for a next image processing task or may store commands or data related to at least one other component (e.g., the image processing unit 230) of the electronic device 200. For example, when image capturing is delayed due to shutter lag or multiple images are quickly captured, a raw image obtained (e.g., a high-resolution image) may be stored in the first and second memory 240 or 280, and its corresponding copy (e.g., a low-resolution image) may be previewed through the display device (e.g., the display module 160 of FIG. 1). Thereafter, if a specified condition is met (e.g., by a user's input or system command), at least part of the raw image stored in the first and second memory 240 or 280 may be obtained and processed, for example, by the image signal processor 232. According to an embodiment of the disclosure, the first and second memory 240 or 280 may be configured as at least part of the memory (e.g., the memory 130 of FIG. 1) of the electronic device 200 or as separate memory that is operated independently from the memory.

According to an embodiment of the disclosure, the first and second memories 240 and 280 may include first memory 240 and second memory 280 that are separated from each other as shown in FIG. 2. According to an embodiment of the disclosure, the first memory 240 may store at least one correction data (e.g., white balance correction data, gamma correction data, knee correction data, or the like). For example, the at least one correction data may be stored in a look-up table (LUT) format. According to an embodiment of the disclosure, the second memory 280 may be non-volatile memory (e.g., flash memory) and may store the image data generated by the image processing unit 230.

Referring to FIG. 2, for convenience of description, the first and second memories 240 and 280 are illustrated as separate components depending on their functions. However, without limited to those described, it should be noted that the first and second memories 240 and 280 may also be implemented as a single component.

The image processing unit 230 may be a component for performing various processing on the image data output from the image sensor 213. The image processing unit 230 may perform image processing (e.g., depth map generation, three-dimensional (3D) modeling, panorama generation, feature point extraction, image mixing, or image compensation (e.g., noise canceling, resolution adjustment, brightness adjustment, blurring, sharpening, or softening)) on an image obtained through the image sensor 213 or an image stored in the memory (e.g., the first memory 240). Additionally or alternatively, the image processing unit 230 may perform control (e.g., exposure time control or read-out timing control) with respect to at least one (e.g., the image sensor 213) of the components included in the image capture unit 210. An image processed by the image processing unit 230 may be stored back in the first and second memory 240 or 280 for further processing, or may be provided to an external component (e.g., the memory 130, the display module 160, the external electronic device 102, the external electronic device 104, or the server 108) outside the image capture unit 210. According to an embodiment of the disclosure, the image processing unit 230 may include a pre-processing unit (e.g., a pre-ISP) 231 and an image signal processor (ISP) 232. The pre-processing unit 231 may perform a function, such as image matching or gamma processing. For example, when there is a shake among a plurality of continuously captured images, the pre-processing unit 231 may remove or reduce the shake component through an image matching process. The image signal processor 232 may generate an entire image signal by correcting and synthesizing the signal received from the pre-processing unit 231. According to an embodiment of the disclosure, the pre-processing unit 231 may be integrated with the image signal processor 232 to constitute the image processing unit 230.

According to various embodiments of the disclosure, the image processing unit 230 may be configured as at least part of the processor 260 (e.g., the processor 120 of FIG. 1), or as a separate processor that is operated independently from the processor 260. For example, according to an embodiment of the disclosure, the pre-processing unit 231 and the image signal processor 232 of the image processing unit 230 may be integrated into the processor 260. In contrast, when the image processing unit 230 is configured as a separate processor different from the processor 260, the images processed by the image processing unit 230 may be displayed through the display module 160, as they are or after undergoing additional image processing.

According to various embodiments of the disclosure, the image processing unit 230 may generate a signal for controlling the lens portion 211 or the image sensor 213 in addition to analyzing and computing the image data output from the image sensor 213. For example, the image processing unit 230 may generate a signal for controlling the first driver 215 to move the lens portion 211 in the optical axis direction or generate a signal for controlling the second driver 216 to move the lens portion 211 or the image sensor 213 for anti-shake purposes.

The processor 260 (e.g., the processor 120 of FIG. 1) may include one or more of a central processing unit (CPU), an application processor (AP), or a communication processor (CP). The processor 260 may perform control on at least one other component included in the electronic device 200, and/or perform an operation or data processing relating to communication. As described above, the processor 260 may include the image processing unit 230 as at least a portion of the processor 260 or may operate as a separate processor operating independently from the image processing unit 230.

The display 270 may include, e.g., a liquid crystal display (LCD), a light emitting diode (LED) display, an organic light emitting diode (OLED) display, or a microelectromechanical systems (MEMS) display, or an electronic paper display. The display 270 may display, e.g., an image captured by the image capture unit 210 or an image whose white balance is corrected by the image processing unit 230. According to various embodiments of the disclosure, the display 270 may include a touchscreen and may receive, e.g., a touch, gesture, proximity or hovering input using an electronic pen or a body portion of the user. The following description of embodiments exemplifies the pre-processing unit 231 included in at least a portion of the image signal processor 232 and thus assumes that the image signal processor 232 has substantially the same configuration as the image processing unit 230. In various embodiments of the disclosure, 'at least one processor' used herein may mean that the image processing unit 230 is provided as at least a portion of, or separately from, the processor 260. In the following description of embodiments of the disclosure, the image signal processor 232 is a separate processor operating independently form the processor 260, as an example. However, this is merely an example and, according to various embodiments of the disclosure, it should be noted that a combination of the image processing unit 230, the image signal processor 232, and the processor 260 is not limited to any one type.

Figure 3:
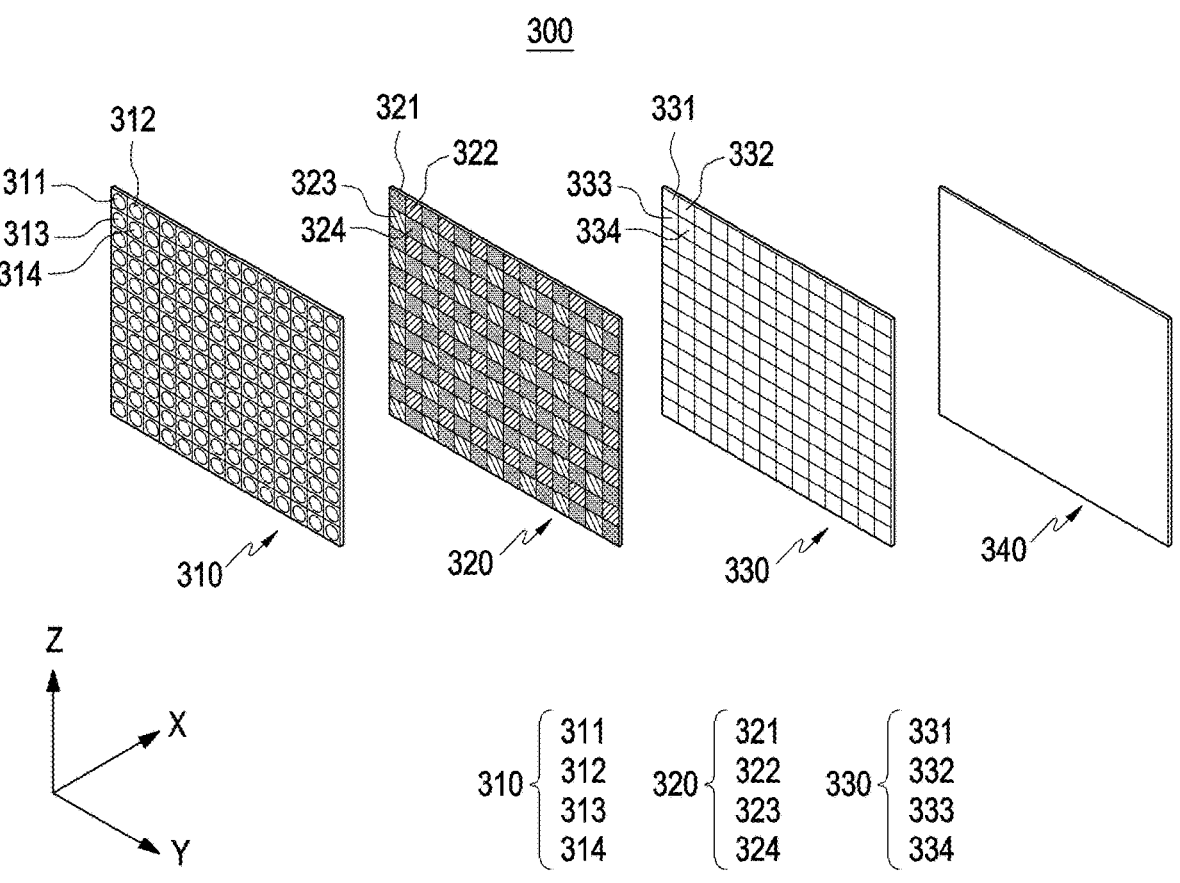
FIG. 3 is a view illustrating an image sensor according to an embodiment of the disclosure.

FIG. 3 is a view illustrating an image sensor according to an embodiment of the disclosure.

Referring to FIG. 3, an image sensor 300 (e.g., the image sensor 213 of FIG. 2) may include a plurality of pixels. FIG. 3 illustrates an example in which 14 pixels and 10 pixels are arranged in the y-axis direction (horizontal direction) and the z-axis direction (vertical direction, respectively, i.e., a total of 140 pixels. However, without limited thereto, the image sensor 300 may include millions to tens of millions of pixels.

The image sensor 300 may include a plurality of micro lens array portions 310, a color filter array portion 320, a light receiving portion 330, and a data computation portion 340. The micro lens array portion 310 may include a plurality of micro lenses that are regularly disposed to form at least portion of light into a specific light receiving element, and the color filter array portion 320 may include one or more types of multiple colors that are spatially separated and may selectively transmit light. According to various embodiments of the disclosure, each of the plurality of pixels included in the image sensor 300 may be assigned one of a plurality of designated reference colors (refer to FIG. 2) (e.g., red R, green G, or blue B). The plurality of pixels may be designed to receive light with a designated wavelength range in each light incident in a direction perpendicular to the y axis and the z axis. The plurality of pixels may output the electrical signal corresponding to the received light. The light receiving portion 330 may include a plurality of light receiving elements (e.g., photodiodes) (first to fourth receiving elements 331, 332, 333, and 334 respectively disposed corresponding to the first to fourth color filters 321, 322, 323, and 324) that convert light of a wavelength selectively incident from the color filter array portion 320 into an electrical signal. The data computation portion 340 may compute the electrical signal of the light receiving portion 330. The data computation portion 340 may be an analog computation unit included in the image sensor 300 or a digital computation unit of the processor (e.g., the processor 260 of FIG. 2).

According to an embodiment of the disclosure, for each unit pixel included in the image sensor 300, micro lenses, color filters, and light receiving elements may be included, and the electrical data output from each unit pixel may be used as a basic unit for computation by the data computation portion 340.

Figure 4:
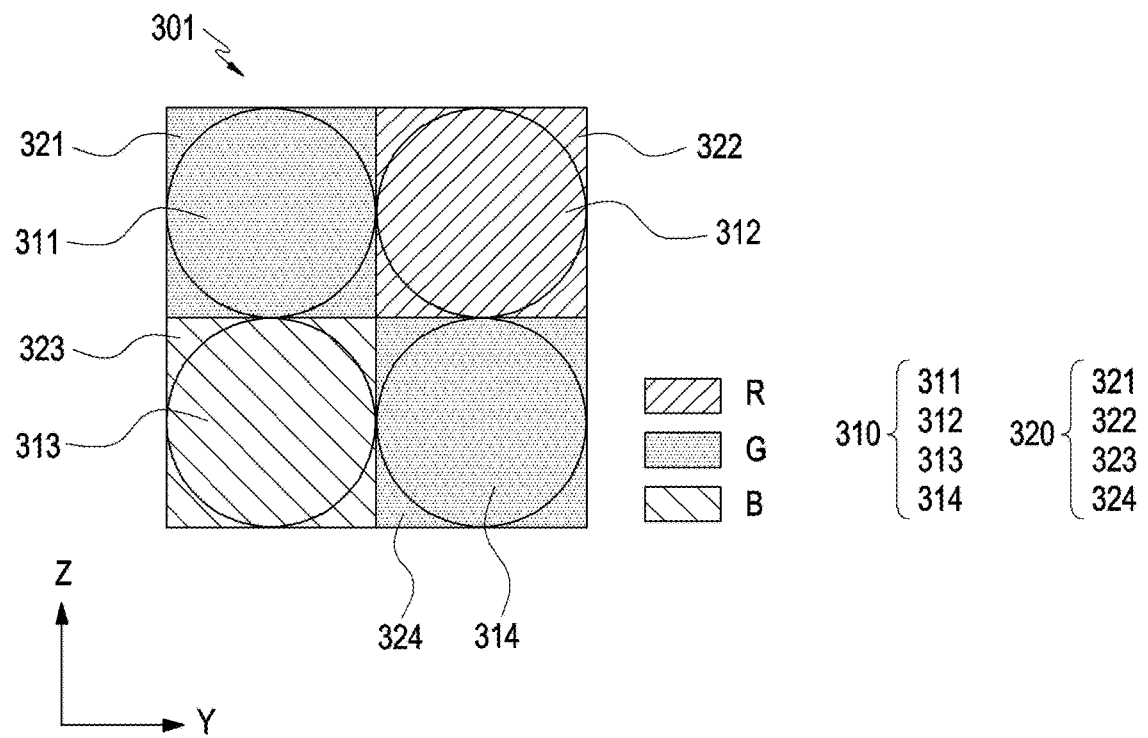
FIG. 4 is a view illustrating a pixel group including a micro lens and a color filter array according to an embodiment of the disclosure.
Figure 5:
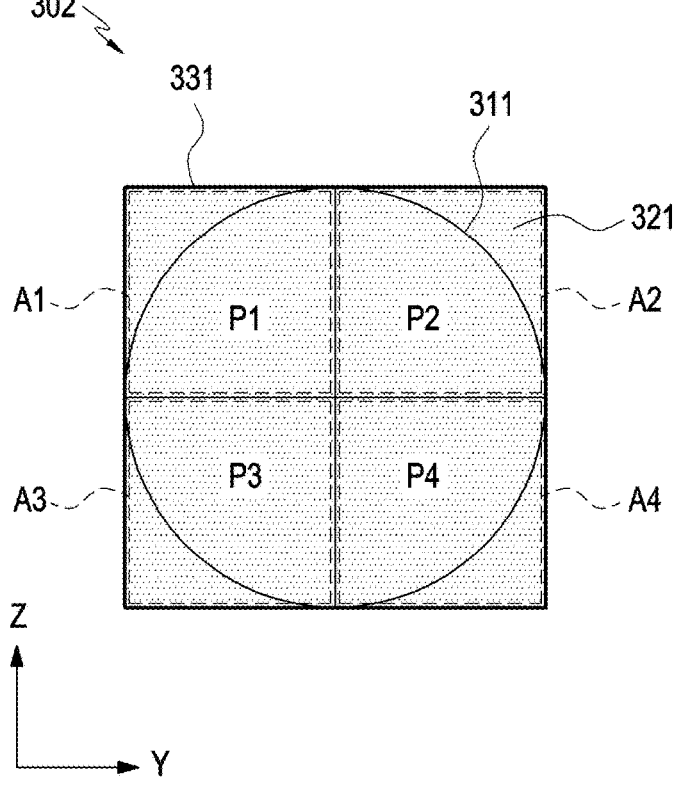
FIG. 5 is a view illustrating a quad pixel structure (4PD pixel structure) according to an embodiment of the disclosure.

FIG. 4 is a view illustrating a pixel group 301 including a micro lens 310 and a color filter array 320 according to an embodiment of the disclosure. FIG. 5 is a view illustrating a 4PD pixel structure according to an embodiment of the disclosure.

The pixel group 301 included in the image sensor 300 may include a combination of two or more unit pixels 302. One unit pixel 302 may include a micro lens, a color filter, and a light receiving element. The microlens may serve to refract and/or focus light. The color filter may be disposed behind the microlens with respect to the propagation path of the light and may transmit light having a designated refer- ence color, i.e., light having a designated wavelength range. The light receiving element may be, e.g., a photodiode disposed behind the micro lens and the color filter. If light reaches the light receiving element, an electrical signal corresponding to the incident light may be output by the photoelectric effect. The electrical signal may generate charge (or current) according to the intensity (or amount) of the received light. FIG. 4 illustrates an embodiment in which four unit pixels 302 are combined into one pixel group 301.

Referring to FIG. 4, one pixel group 301 may include a color filter array 320 in a 2×2 array. In the color filter array 320 according to the embodiment of FIG. 4, a first color filter 321 and a second color filter 322 included in a first row may be formed in [green G, red R], respectively, and a third color filter 323 and a fourth color filter 324 included in a second row may be formed in [blue B, green G], respec- tively. In other words, one pixel group 301 may include a color filter array 320 formed in a [green G, red R]×[blue B, green G] pattern. Further, the plurality of micro lenses 310 included in the pixel group 301 may include first to fourth micro lenses 311, 312, 313, and 314 respectively disposed corresponding to the first to fourth color filters 321, 322, 323, and 324. Further, the pixel group 301 may be repeatedly arranged, forming the image sensor 300 of FIG. 3. The repeated arrangement structure and pattern of the color filter array 320 may vary according to embodiments. As an example, FIG. 4 illustrates a pixel group 301 having a color filter array 320 formed in a Bayer pattern. However, without limited thereto, the color filter array 320 may be formed in various patterns including RGB, CYYM, CYGM, RGBW, RYYB, and X-trans. Although the following description focuses primarily on an RGB pattern (or RGGB pattern) for ease of description, it should be noted that other repeated arrangement structures and patterns of the color filter array 320 may be adopted without limitations. According to various embodiments of the disclosure, a plurality of pixel groups 301 as illustrated in FIG. 4 may be provided to form the image sensor 300.

According to some embodiments of the disclosure, one micro lens and one color filter may be disposed in a unit pixel, and one light receiving element may be disposed behind the color filter. In other words, one light receiving element may be disposed in one unit pixel.

Alternatively, according to another embodiment of the disclosure, one micro lens and one color filter may be disposed in a unit pixel, and a plurality of light receiving elements may be disposed behind the color filter.

According to an embodiment of the disclosure, two, three, or four or more light receiving elements may be disposed in the unit pixel 302. When a plurality of light receiving elements are disposed in the unit pixel 302, elements having the same specifications may be formed symmetrically (line symmetry, or point symmetry) with respect to the center of the unit pixel. For example, when two light receiving elements are disposed in the unit pixel 302, the two light receiving elements may be linearly symmetrically disposed in a left/right direction or a top/bottom direction with respect to the center of the unit pixel. When two light receiving elements are disposed in the unit pixel 302, the unit pixel structure may be referred to as a dual pixel structure (here- inafter, referred to as a "2PD pixel structure"), when three light receiving elements are disposed in the unit pixel 302, the unit pixel structure may be referred to as a triple pixel structure (hereinafter, referred to as a "3PD pixel structure"), and when four light receiving elements are disposed in the unit pixel 302, the unit pixel structure may be referred to as a quad pixel structure (hereinafter, referred to as a "4PD pixel structure"). As described above, in the disclosure, a case in which the unit pixel 302 includes a plurality of (N) light receiving elements (or a case in which each micro lens includes a plurality of (N) light receiving elements) may be referred to as an "NPD pixel structure".

In various embodiments of the disclosure, each light receiving element included in the unit pixel 302, e.g., the 2PD pixel structure, the 3PD pixel structure, the 4PD pixel structure, and/or the NPD pixel structure may be referred to as a "sub light receiving portion (or sub pixel)". Alterna- tively, the light receiving element included in each unit pixel 302 may also be referred to as a 'photoelectric conversion element'. Further, the light receiving element included in each unit pixel may include, e.g., a photodiode, but may alternatively include a pinned-photodiode, a phototransistor, or a photogate.

Each of the plurality of light receiving elements included in the unit pixel 302 may independently capture incident light as an image. While each of the plurality of light receiving elements captures the incident light into the image, the incident light may be output as a photoelectric conver- sion signal.

According to various embodiments of the disclosure, as shown in FIG. 5, each unit pixel 302 may be divided into four portions A1, A2, A3, and A4, i.e., two portions in the Y direction (e.g., the Y direction of FIG. 4) and two portions in the Z direction (e.g., the Z direction of FIG. 4) as four different light receiving elements are disposed, and the photoelectric conversion signal of each light receiving ele- ment may be independently read. According to an embodi- ment of the disclosure, four light receiving elements P1, P2, P3, and P4 may be provided in the unit pixel 302 including one micro lens 311 and one color filter 321. According to the embodiment illustrated in FIG. 5 of the disclosure, each of the plurality of image pixels included in the image sensor may have a 4 PD pixel structure including four light receiv- ing elements in one micro lens, and each of the plurality of image pixels may include a light receiving element P1, a light receiving element P2, a light receiving element P3, and a light receiving element P4.

According to an embodiment of the disclosure, a phase difference detection operation may be performed using an arrangement relationship of different light receiving ele- ments included in each unit pixel. The 'phase difference detection operation' may be performed in each of the direc- tions in which the light receiving elements are disposed. Taking the unit pixel of FIG. 5 as an example, the 'phase difference detection operation' may include an operation of detecting a phase difference in a horizontal direction between the light receiving element P1 and the light receiving element P2 (or the light receiving element P3 and the light receiving element P4) disposed adjacent to each other in the horizontal direction. Alternatively, the 'phase difference detection operation' may include an operation of detecting a phase difference in a vertical direction between the light receiving element P1 and the light receiving element P3 (or the light receiving element P2 and the light receiving element P4) disposed adjacent to each other in the vertical direction.

Figure 6:
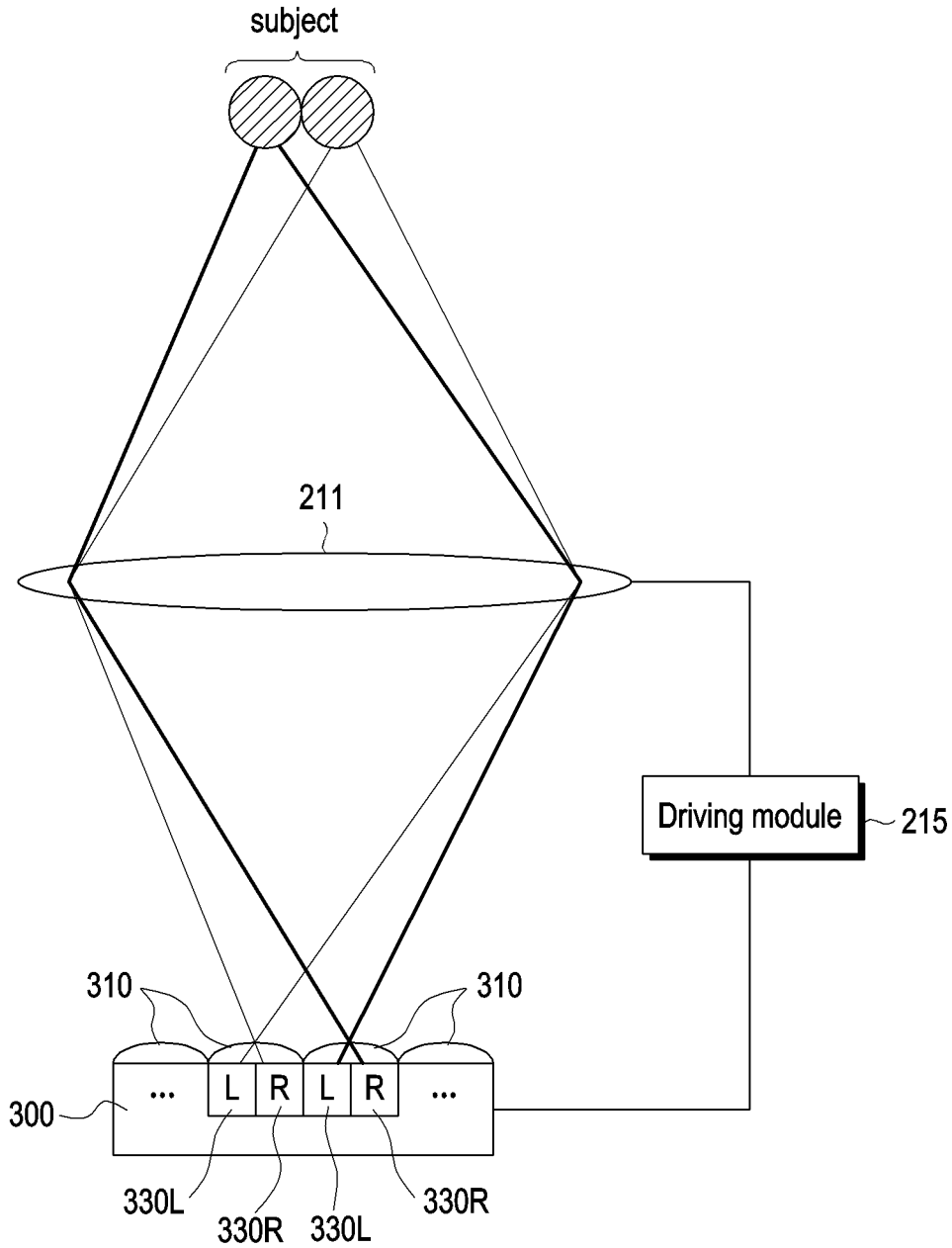
FIG. 6 is a view illustrating an on-focus state in a process of detecting a phase difference in a horizontal direction according to an embodiment of the disclosure.
Figure 7:
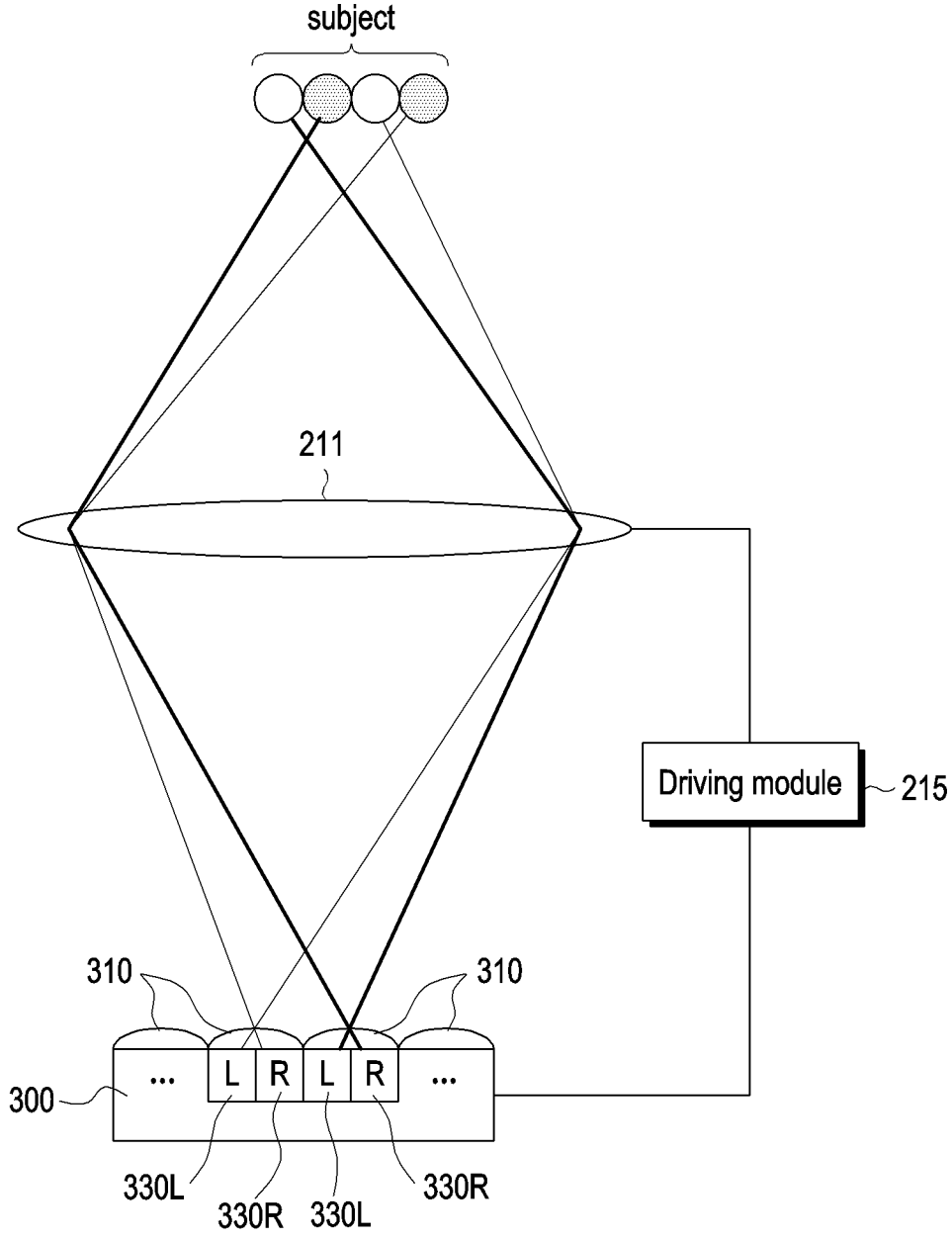
FIG. 7 is a view illustrating a de-focus state in a process of detecting a phase difference in a horizontal direction according to an embodiment of the disclosure.

FIGS. 6 and 7 are views illustrating an example of detecting a phase difference in a horizontal direction using photoelectric conversion signals read for a plurality of light receiving elements according to various embodiments of the disclosure.

For example, FIGS. 6 and 7 may show an on-focus state and a de-focus state while detecting a phase difference in a horizontal direction. FIG. 6 illustrates a path of light in an on-focus state according to an embodiment of the disclosure, and FIG. 7 illustrates a path of light in a de-focus state according to an embodiment of the disclosure. In the disclosure, the term "on-focus" may refer to a case where a pixel disparity is 0 when an image for a specific object is obtained, and the term "de-focus" may refer to a case where the pixel disparity is not 0.

Referring to FIG. 6, light receiving elements 330L and 330R according to various embodiments of the disclosure may receive light reflected from a subject. The light may be received through the main lens 211 and the micro lens 310. In the on-focus state as illustrated in FIG. 6, the light receiving element L 330L and the light receiving element R 330R corresponding to one micro lens 310 may receive light reflected from the same subject. However, referring to FIG. 7, in the de-focus state, the light receiving element L 330L and the light receiving element R 330R corresponding to one microlens 310 may receive light reflected from different subjects. As illustrated in FIG. 7, in the de-focus state, i.e., in the state in which the pixel disparity is not 0, the electronic device may output an image that is not clear because the focus of the electronic device is not correct. Therefore, the electronic device may detect the pixel disparity through the phase difference detection operation, and may adjust the focus of the lens 211 through the driving module 215.

Figure 8:
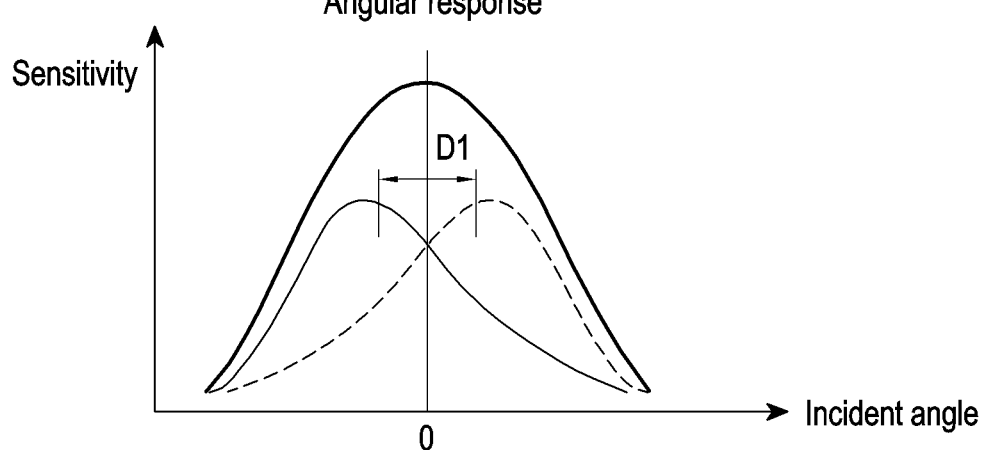
FIG. 8 is a graph illustrating sensitivity to incident angle for a light receiving element according to an embodiment of the disclosure.
Figures 9A, 9B:
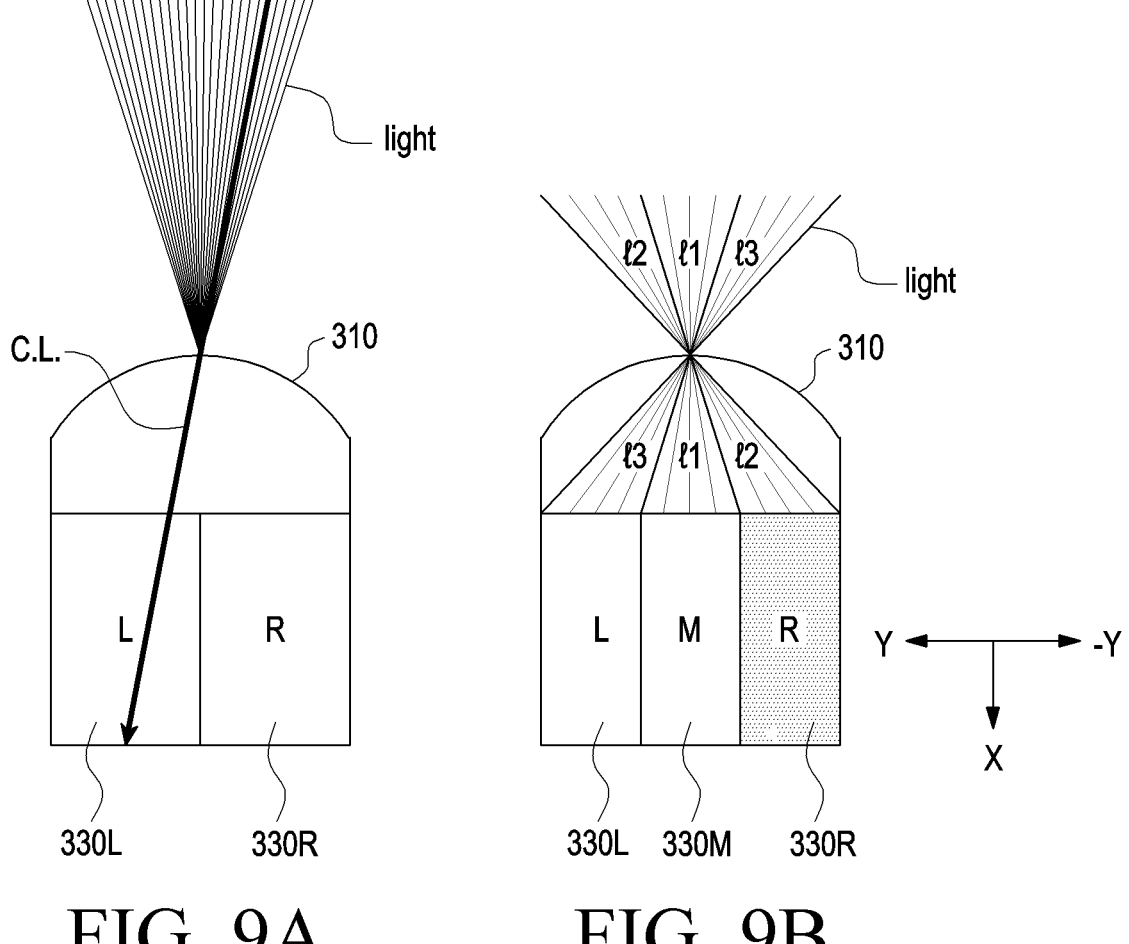
FIGS. 9A and 9B illustrate concept view illustrating a method for reading photoelectric conversion signals of a plurality of light receiving elements of that of FIG. 6 according to an embodiment of the disclosure.

FIG. 8 is a graph illustrating sensitivity to incident angle for a light receiving element according to an embodiment of the disclosure. FIGS. 9A and 9B illustrate a concept view illustrating a state in which incident light reaches an NPD pixel structure according to an embodiment of the disclosure.

Referring to FIG. 8, the incident angle-to-light receiving sensitivity graph L by the light receiving element L 330L mentioned in FIGS. 6 and 7 is shown in solid line, and the incident angle-to-light receiving sensitivity graph R by the light receiving element R 330R is shown in dashed line. The bold solid line graph shown in FIG. 8 may show the overall sensitivity of the unit pixel relative to the incident angle. The light receiving sensitivity graphs L and R of FIG. 8 may indicate a case in which de-focus (or pixel disparity) is positive. The light receiving sensitivity graphs L and R of FIG. 8 may change according to, e.g., an increase or decrease in de-focus. When the de-focus (or pixel disparity) is negative, the positions of the light receiving sensitivity graphs L and R may be changed from each other.

FIGS. 9A and 9B may illustrate that incident light reaches a 2PD pixel structure (or 4PD pixel structure) as an example of the NPD pixel structure, and FIG. 9B may illustrate that incident light reaches a 3PD pixel structure (or 9PD pixel structure) as another example of the NPD pixel structure.

Referring to FIGS. 8 and 9A, a sensitivity value by the light receiving element L 330L and a sensitivity value by the light receiving element R 330R may be changed according to a change in incident angle. When the de-focus is large, the length of D1 indicating the distance between the maximum sensitivity value of the light receiving element L 330L and the maximum sensitivity value of the light receiving element R 330R may be increased, and when the de-focus is small, the length of D1 indicating the distance between the maximum sensitivity value of the light receiving element L 330L and the maximum sensitivity value of the light receiving element R 330R may be decreased. An image having a disparity value corresponding to the length of D1 may be output. The length of D1 may be long in a state in which the degree to which the microlens separates the light bundle is high, i.e., in a state in which the separation ratio is high, which may be advantageous for a phase difference operation (e.g., auto-focusing (AF)). Here, the 'degree to which the micro lens separates the light bundle' may be determined by various specifications (refractive power, material, density, effective diameter, or the like) of the micro lens. However, as described above in the background art, when the phase difference operation is advantageous, the image output (e.g., resolution restoration) according to the remosaic may be disadvantageous.

Accordingly, according to various embodiments of the disclosure, a plurality of sub light receiving portions including at least three light receiving elements in one micro lens may be disclosed, as an electronic device advantageous for both phase difference computation and image output (e.g., resolution restoration) according to remosaic.

According to an embodiment of the disclosure, the electronic device may include a plurality of sub light receiving portions including a first sub light receiving portion 330M, a second sub light receiving portion 330L (e.g., the light receiving element L of FIG. 9A, and a third sub light receiving portion 330R (e.g., the light receiving element R of FIG. 9A) illustrated in FIG. 9B. For example, the plurality of sub light receiving portions illustrated in FIG. 9B may include a first sub light receiving portion 330M receiving a first light 11 of incident light, a second sub light receiving portion 330L (e.g., the light receiving element L of FIG. 9A) disposed side by side with the first sub light receiving portion 330M in a first direction (e.g., Y direction) and receiving a second light 12 adjacent to the first light 11 of the incident light, and a third sub light receiving portion 330R (e.g., the light receiving element R of FIG. 9A) disposed in a direction (e.g., −Y direction) opposite to the first direction with respect to the first sub light receiving portion 330M and receiving a third light 13 adjacent to the first light of the incident light. Here, the first light 11 may refer to light in which the main light (C.L., chief lay) is formed in the central area of the unit pixel among the light incident through the micro lens 310, and the second light 12 and the third light 13 may refer to light in which the main light is formed in the surrounding area of the unit pixel among the light incident through the micro lens 310.

Figure 10:
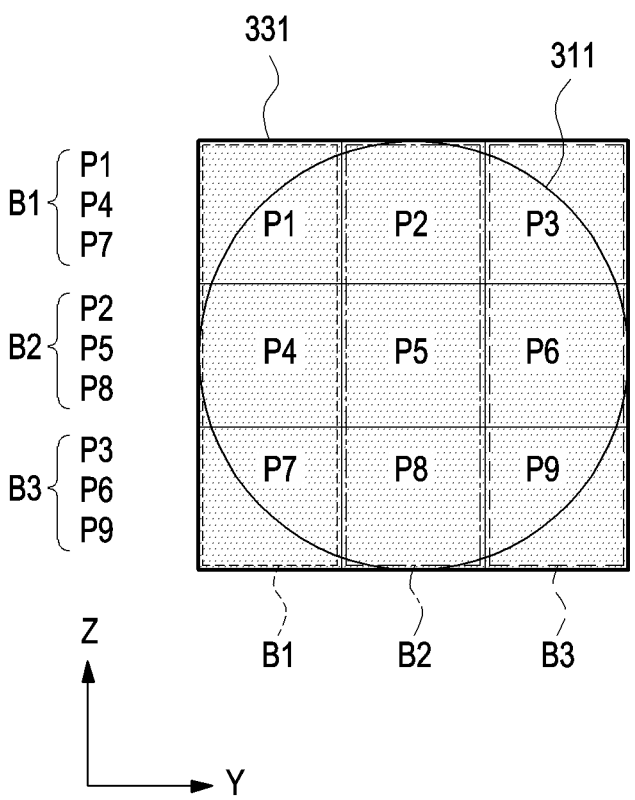
FIG. 10 is a view illustrating auto focusing (AF) points for phase difference detection in a horizontal direction and phase difference detection in a vertical direction in an image sensor including a plurality of image pixels according to an embodiment of the disclosure.

FIG. 10 illustrates a 9PD pixel structure according to an embodiment of the disclosure.

The plurality of sub light receiving portions may have a 9PD pixel structure as illustrated in FIG. 10. In this case, the first sub light receiving portion (e.g., the first sub light receiving portion 330M of FIG. 9B) may correspond to a B2 area including the light receiving elements P2, P5, and P8, the second sub light receiving portion (e.g., the second sub light receiving portion 330L of FIG. 9B) may correspond to a B1 area including the light receiving elements P1, P4, and P7, and the third sub light receiving portion (e.g., the third sub light receiving portion 330R) may correspond to a B3 area including the light receiving elements P3, P6, and P9.

Other various embodiments of the disclosure, as well as the embodiments shown in FIG. 9B and FIG. 10, may be applied to any plurality of sub light receiving portions including at least three light receiving elements in one micro lens, as the plurality of sub light receiving portions included in the electronic device according to various embodiments of the disclosure. Other various examples of the plurality of sub light receiving portions are described below with reference to FIGS. 16A, 16B, 16C, and 16D.

A method for detecting a phase difference and a method for outputting an image (or restoring resolution) using a plurality of sub light receiving portions included in an electronic device are described with reference to FIGS. 11 to 15.

Figures 11A, 11B:
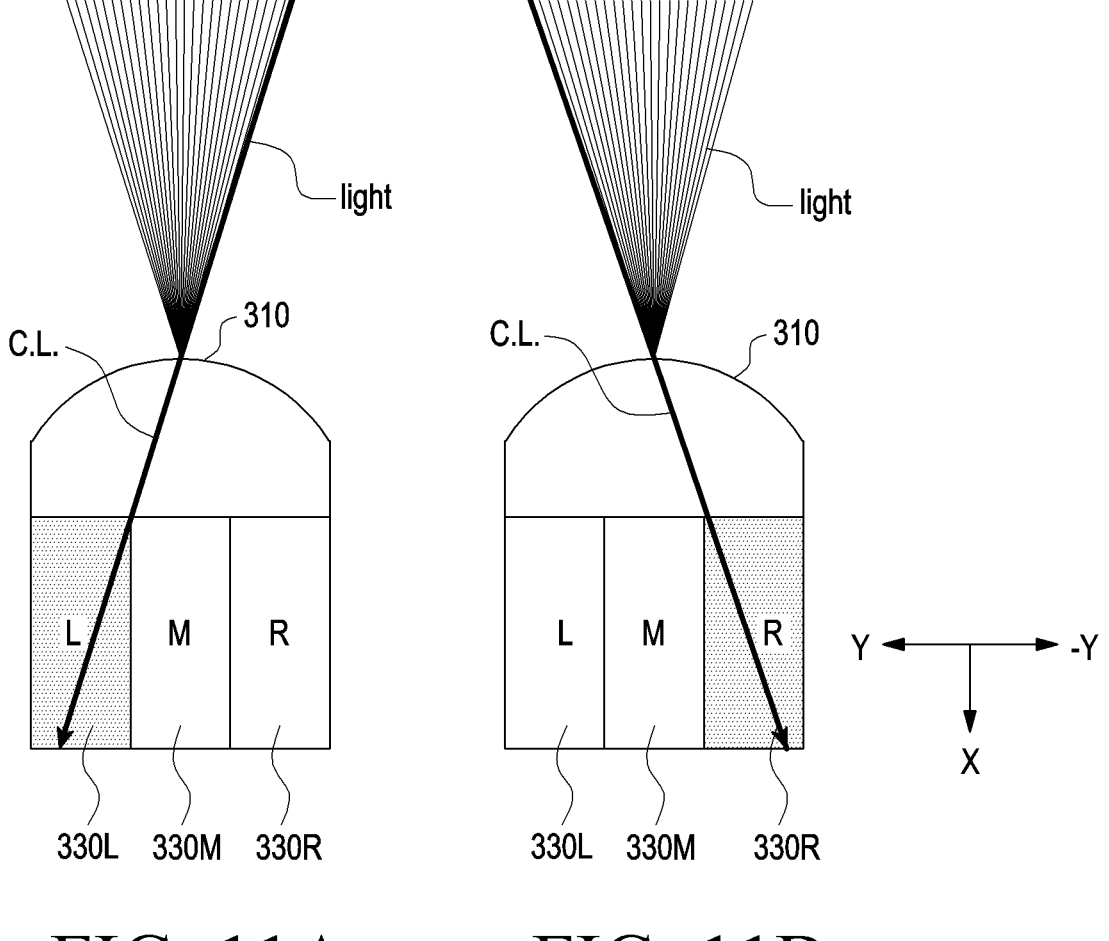
FIGS. 11A and 11B illustrate block diagrams illustrating components of an electronic device for phase difference detection in a vertical and horizontal direction according to an embodiment of the disclosure.
Figure 12:
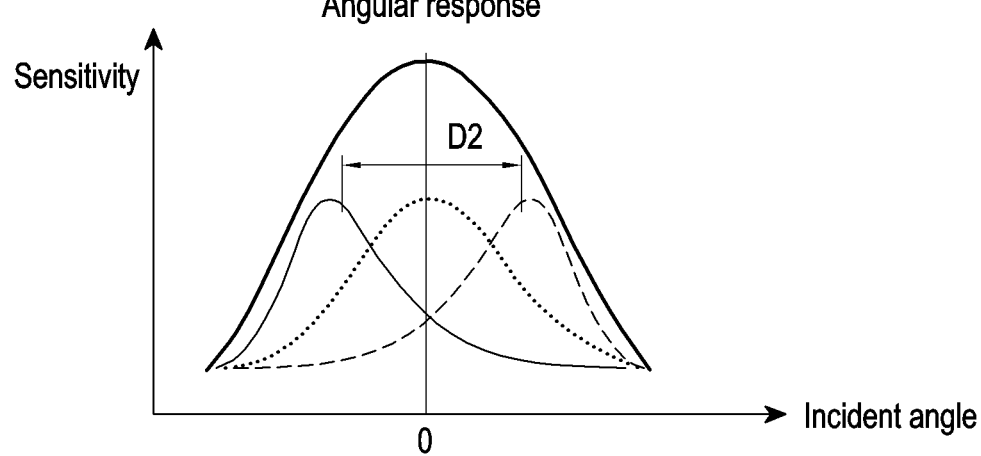
FIG. 12 is a graph illustrating sensitivity to incident angle for a light receiving element when detecting a phase difference using a plurality of sub light receiving portions included in an electronic device according to an embodiment of the disclosure.

FIGS. 11A and 11B illustrate a method for detecting a phase difference using a plurality of sub light receiving portions included in an electronic device according to an embodiment of the disclosure. FIG. 12 is a graph illustrating sensitivity to incident angle for a light receiving element when detecting a phase difference using a plurality of sub light receiving portions included in an electronic device according to an embodiment of the disclosure.

An electronic device including a plurality of sub light receiving portions according to various embodiments of the disclosure may set, as a basic unit of phase difference computation, a comparison value of electrical data of the second sub light receiving portion 330L and electrical data of the third sub light receiving portion 330R, except for the first sub light receiving portion 330M, at the request of phase difference detection. For reference, the operation of setting the electrical data of the second sub light receiving portion 330L and the electrical data of the third sub light receiving portion 330R as the basic unit of phase difference computation and the operation of detecting a phase difference may be performed by the data computation portion (e.g., the data computation portion 340 of FIG. 3).

Referring to FIGS. 11A and 11B, as an example, since the first light 11 passing through the central area of the micro lens 310 is less influenced by the separation ratio of the micro lens 310 compared with the second light 12 and the third light 13, the electrical data of the first sub light receiving portion 330M receiving the first light 11 may be excluded from computation in phase difference detection.

Referring to FIG. 12, the incident angle-to-light receiving sensitivity graph M by the first sub light receiving portion 330M, as mentioned in FIGS. 11A and 11B, is shown in dotted line, the incident angle-to-light receiving sensitivity graph L by the second sub light receiving portion 330L is shown in solid line, and the incident angle-to-light receiving sensitivity graph R by the third sub light receiving portion 330R is shown in dashed line. The bold solid line graph shown in FIGS. 11A and 11B may show the overall sensitivity of the unit pixel relative to the incident angle. In addition, in FIG. 12, the light receiving sensitivity graphs L and R may vary depending on increases/decreases in defocus (or pixel disparity).

Referring to FIGS. 11 and 12 together, the length of D2 which indicates the maximum sensitivity values of the second sub light receiving portion 330L and the third sub light receiving portion 330R may be formed to be longer than the length of D1 in the embodiment illustrated in FIG. 8. In other words, the electronic device including the plurality of light receiving portions according to various embodiments of the disclosure may have an effect of obtaining a substantially high separation degree of the micro lens when performing computation with the first sub light receiving portion 330M excluded which is less influenced with the phase difference detection operation when detecting a phase difference. Thus, it may be more advantageous than the embodiment of FIG. 8 in phase difference computation.

Referring back to FIG. 10, in the 9PD pixel structure, the electronic device according to various embodiments of the disclosure may perform a phase difference detection operation using only electrical data of light receiving elements in the B1 area and the B3 area, except for the B2 area.

Figures 13A, 13B:
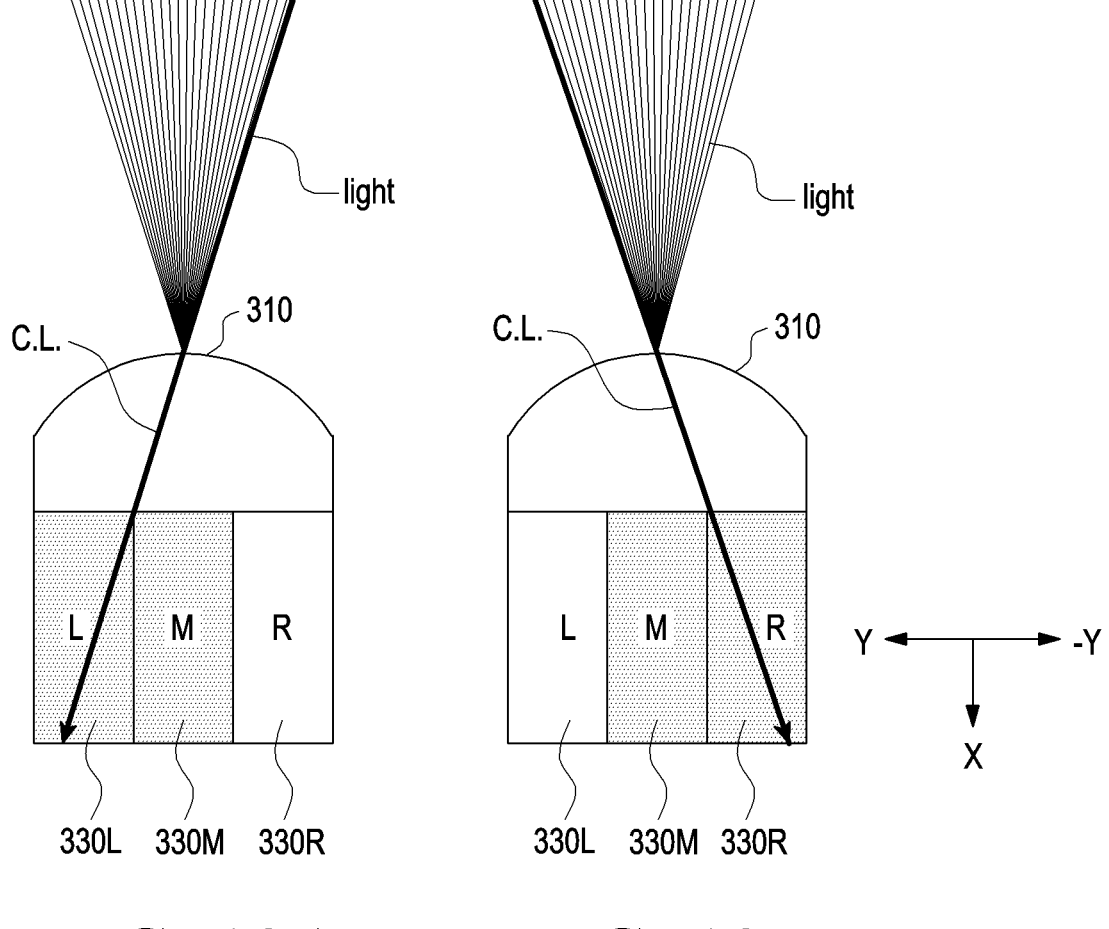
FIGS. 13A and 13B illustrate a method for outputting an image using a plurality of sub light receiving portions included in an electronic device according to an embodiment of the disclosure.
Figure 14:
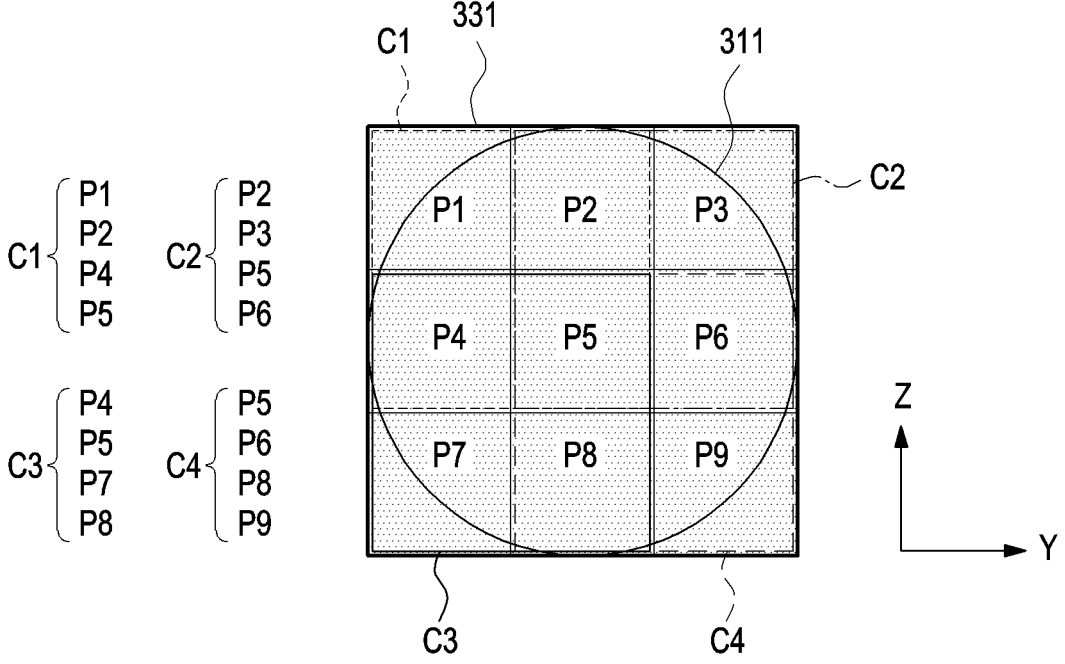
FIG. 14 is a view illustrating a method for bundling (sampling) a plurality of sub light receiving portions into a basic unit for resolution separation in a 9PD pixel structure according to an embodiment of the disclosure.
Figure 15:
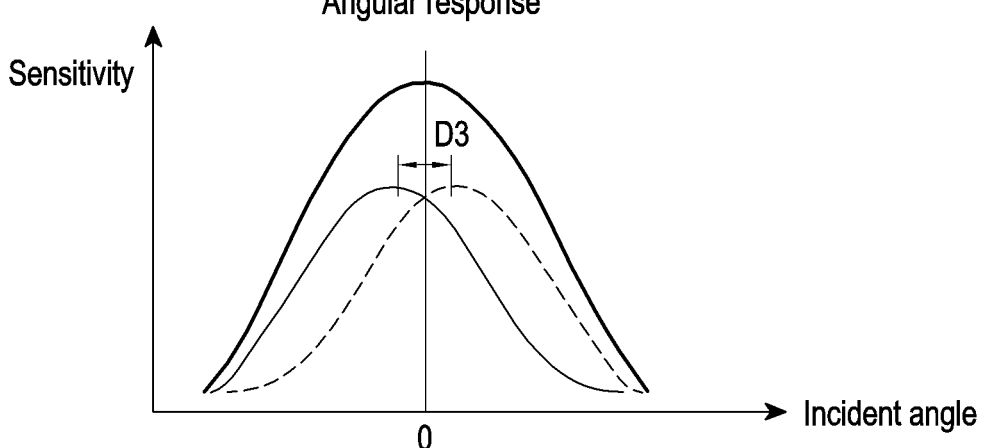
FIG. 15 is a graph illustrating sensitivity to incident angle for a light receiving element when outputting an image using a plurality of sub light receiving portions included in an electronic device according to an embodiment of the disclosure.

FIG. 13 is a view illustrating a method for outputting an image using a plurality of sub light receiving portions included in an electronic device according to an embodiment of the disclosure. FIG. 14 is a view illustrating a method for bundling (sampling) a plurality of sub light receiving portions into a basic unit for resolution separation in a 9PD pixel structure according to an embodiment of the disclosure. FIG. 15 is a graph illustrating sensitivity to incident angle for a light receiving element when outputting an image using a plurality of sub light receiving portions included in an electronic device according to an embodiment of the disclosure.

An electronic device including a plurality of sub light receiving portions according to various embodiments of the disclosure may set, as a basic unit of resolution separation, a synthesized value of electrical data of the first sub light receiving portion 330M and electrical data of the second sub light receiving portion 330L and a synthesized value of the electrical data of the first sub light receiving portion 330M and electrical data of the third sub light receiving portion 330R at the request of image output. For reference, the operation of setting, as the basic unit of resolution separation, the synthesized value of the electrical data of the first sub light receiving portion 330M and the electrical data of the second sub light receiving portion 330L and the synthesized value of the electrical data of the first sub light receiving portion 330M and the electrical data of the third sub light receiving portion 330R and the image output may be performed by the data computation portion (e.g., the data computation portion 340 of FIG. 3).

Referring to FIG. 13, it is possible to substantially reduce the separation ratio of the micro lens by synthesizing the electrical data of the first sub light receiving portion 330M receiving the first light 11 and the second sub light receiving portion 330L receiving the second light 12 and synthesizing the electrical data of the first sub light receiving portion 330M receiving the first light 11 and the third sub light receiving portion 330R receiving the third light 13.

Referring to FIG. 14, the plurality of sub light receiving portions may have a 9PD pixel structure as shown in FIG. 14. The embodiment of FIG. 13 may be similarly applied to the embodiment of FIG. 14 represented in two-dimensional (2D). In the case of the 9PD pixel, the electronic device may synthesize electrical data of the light receiving elements P1, P2, P3, and P4 (area C1), synthesize electrical data of the light receiving elements P2, P3, P5, and P6 (area C2), synthesize electrical data of the light receiving elements P4, P5, P7, and P8 (area C3), and/or synthesize electrical data of the light receiving elements P5, P6, P8, and P9 (area C4). According to an embodiment of the disclosure, all light receiving element areas for synthesizing electrical data to output an image may include a central element (center pd). For example, in the 9PD pixel structure illustrated in FIG. 14, the central element may correspond to the light receiving element P5. Accordingly, the separation ratio of the micro lens may be substantially lowered, and sampling information according to different position information about the light receiving elements may be obtained, and thus the remosaic operation may be easily performed.

Referring to FIG. 15, the incident angle-to-light receiving sensitivity graph L+M by the first sub light receiving portion 330M and the second sub light receiving portion 330L, as mentioned in FIG. 13, is shown in solid line, and the incident angle-to-light receiving sensitivity graph R+M by the first sub light receiving portion 330M and the third sub light receiving portion 330R is shown in dashed line. The bold solid line graph shown in FIG. 15 may show the overall sensitivity of the unit pixel relative to the incident angle.

Referring to FIG. 15, the length of D3 which indicates the maximum sensitivity values of the second sub light receiving portion 330L and the third sub light receiving portion 330R may be formed to be shorter than the length of D1 in the embodiment illustrated in FIG. 8. In other words, the electronic device including the plurality of sub light receiving portions according to various embodiments of the disclosure may form a low separation degree by computing the synthesized data of the first sub light receiving portion 330M positioned in the central area of the pixel and the second sub light receiving portion 330L adjacent thereto or computing the synthesized data of the first sub light receiving portion 330M and the third sub light receiving portion 330R when outputting an image. Since the separation degree may be formed to be reduced, the remosaic which is a resolution separation process may be relatively easily performed. Accordingly, according to the embodiment shown in FIG. 15, it is possible to output an image having a higher resolution that that in the embodiment of FIG. 8. For example, in the embodiments shown in FIG. 8 and FIG. 9A, it is possible to output two images respectively corresponding to two sub light receiving portions using the electrical signal of the light received by two sub light receiving portions 330L and 330R under one micro lens. In contrast, in the embodiments shown in FIG. 15 and FIG. 9B, since the synthesized value of the electrical signals of the first sub light receiving portion 330M and the second sub light receiving portion 330L and the synthesized value of the electrical signals of the first sub light receiving portion 330M and the third sub light receiving portion 330R are used, two images may be output using three sub light receiving portions. In the embodiments shown in FIG. 15 and FIG. 9B, since the electrical signals of the light received by three sub light receiving portions 330L, 330M, and 330R under one micro lens are used, the images output according to the embodiments shown in FIG. 15 and FIG. 9B may be high-quality images with relatively less artifacts as compared with the images output according to the embodiments shown in FIGS. 8 and 9A, although the numbers of images are the same. In other words, while the embodiments of FIGS. 8 and 9A output images by performing remosaic using the electrical data obtained by two sub light receiving portions 330L and 330R without a change in separation degree, the embodiments of FIGS. 15 and 9B perform remosaic by changing and using the separation degree through synthesis of the electrical data obtained by at least three sub light receiving portions 330L, 330M, and 330R, thereby outputting images with less artifacts. Since images with less artifacts are output, the image output from the electronic device may have high resolution.

In sum, according to various embodiments of the disclosure, phase difference computation may be more accurately performed by increasing separation degree with the first sub light receiving portion 330M excluded and, in remosaic, the first sub light receiving portion 330M may be included to reduce the separation degree to thereby obtain a high-resolution image through easy remosaic.

FIGS. 16A, 16B, 16C, and 16D views illustrating an image sensor including a plurality of sub light receiving portions according to an embodiment of the disclosure.

The image sensor may include a plurality of image pixels, and each unit pixel may include a plurality of sub light receiving portions for one micro lens 311 and one color pixel 321.

Referring to FIG. 16A, the unit pixel 331-1 according to an embodiment may form a 9PD pixel structure including nine light receiving elements having the same size. As another example of the 9PD pixel structure, the unit pixel 331-2 illustrated in FIG. 16B may include nine light receiving elements at least partially having different sizes. In the embodiments illustrated in FIGS. 16A and 16B, the central element (center pd) may correspond to the light receiving element P5.

According to various embodiments of the disclosure, the image sensor may be a plurality of sub light receiving portions and may not be limited to a 3PD pixel structure or a 9PD pixel structure. For example, the unit pixel 331-3 of the 16PD pixel structure including 16 light receiving elements as illustrated in FIG. 16C, or the unit pixel 331-4 of the 25PD pixel structure including 25 light receiving elements as illustrated in FIG. 16D may also be included in the category according to various embodiments of the disclosure. In the embodiment illustrated in FIG. 16C, the central element (center pd) may correspond to P6, P7, P10, or P11, and in the embodiment illustrated in FIG. 16D, the central element (center pd) may correspond to P13 or P7, P8, P9, P12, P13, P14, P17, P18, or P19. Other various embodiments for the pixel structure may also be included in the category of the disclosure.

Figure 17A:
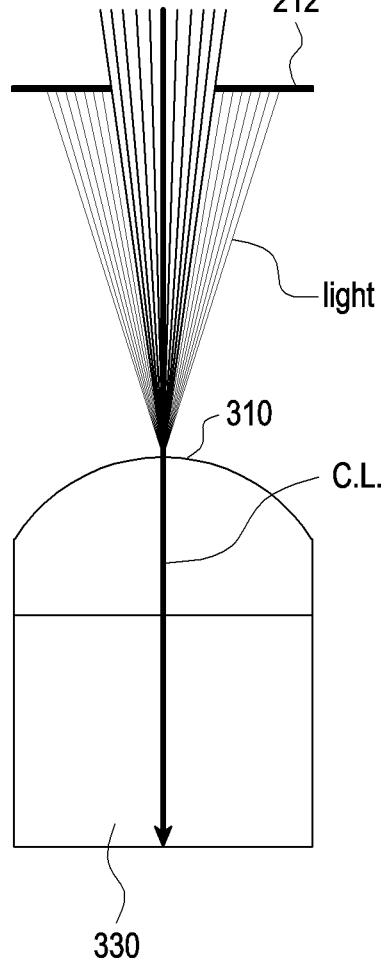
FIGS. 17A and 17B illustrate a method for implementing a diaphragm exposure mode even without a mechanical constitutional device of a diaphragm according to an embodiment of the disclosure.
Figure 17B:
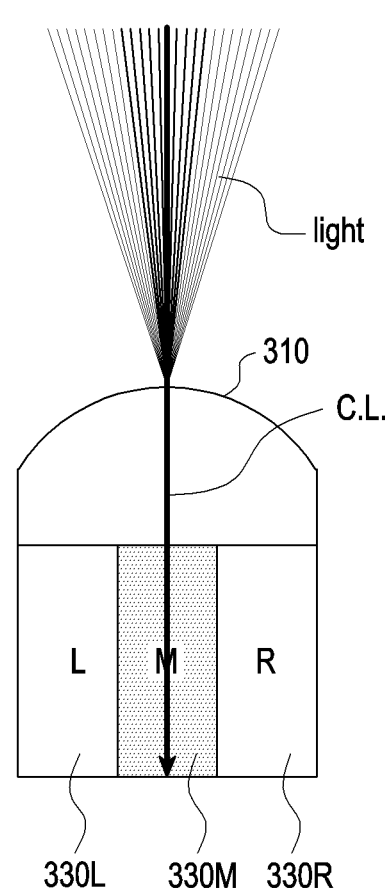

FIGS. 17A and 17B illustrate a method for implementing a diaphragm exposure mode even without a mechanical constitutional device of a diaphragm according to an embodiment of the disclosure.

Referring to FIGS. 17A and 17B, an exposure mode of a diaphragm may be implemented using electrical data including at least the first sub light receiving portion 330M (or the first light receiving element) among the plurality of sub light receiving portions (or the plurality of light receiving elements). FIG. 17A illustrates a diaphragm 212 included in an electronic device including a camera. As illustrated in FIG. 17B, the mechanical structure may be similar to an embodiment in which light is received using only the first sub light receiving portion 330M in various embodiments of the disclosure. For example, according to the embodiment illustrated in FIG. 17A, the amount of light incident on the microlens 310 may be reduced using the diaphragm 212. Light may be incident on the micro lens 310 according to the allowed incident angle of the lens. By adjusting the opening area of the diaphragm 212, some light light1 (hereinafter, 'first light light1') may be stopped from entering while only the light light2 (hereinafter, 'second light light2') corresponding to the adjusted opening area may be incident. According to the embodiment illustrated in FIG. 17B, when the first light light1 and the second light light2 are incident on the micro lens 310, an electrical signal corresponding to the light incident on the first to third sub light receiving portions 330M, 330L, and 330R may be generated. Further, according to the embodiment illustrated in FIG. 17B, when the electronic device uses only the electrical signal corresponding to the light incident on the first sub light receiving portion 330M, it is possible to have an effect of providing a diaphragm according to the embodiment shown in FIG. 17A, without providing a separate diaphragm.

For example, in the embodiment illustrated in FIGS. 16A, 16B, 16C, and 16D, in FIGS. 16A and 16B, the diaphragm exposure mode may be implemented using the light receiving element P5 which is the central element (center pd), and in FIG. 16C, the diaphragm exposure mode may be implemented using the light receiving elements P6, P7, P10, and P11 which are the central elements. In FIG. 16D, the diaphragm exposure mode may be implemented using the central elements P13 or P7, P8, P9, P12, P13, P14, P17, P18, and P19.

Figure 18:
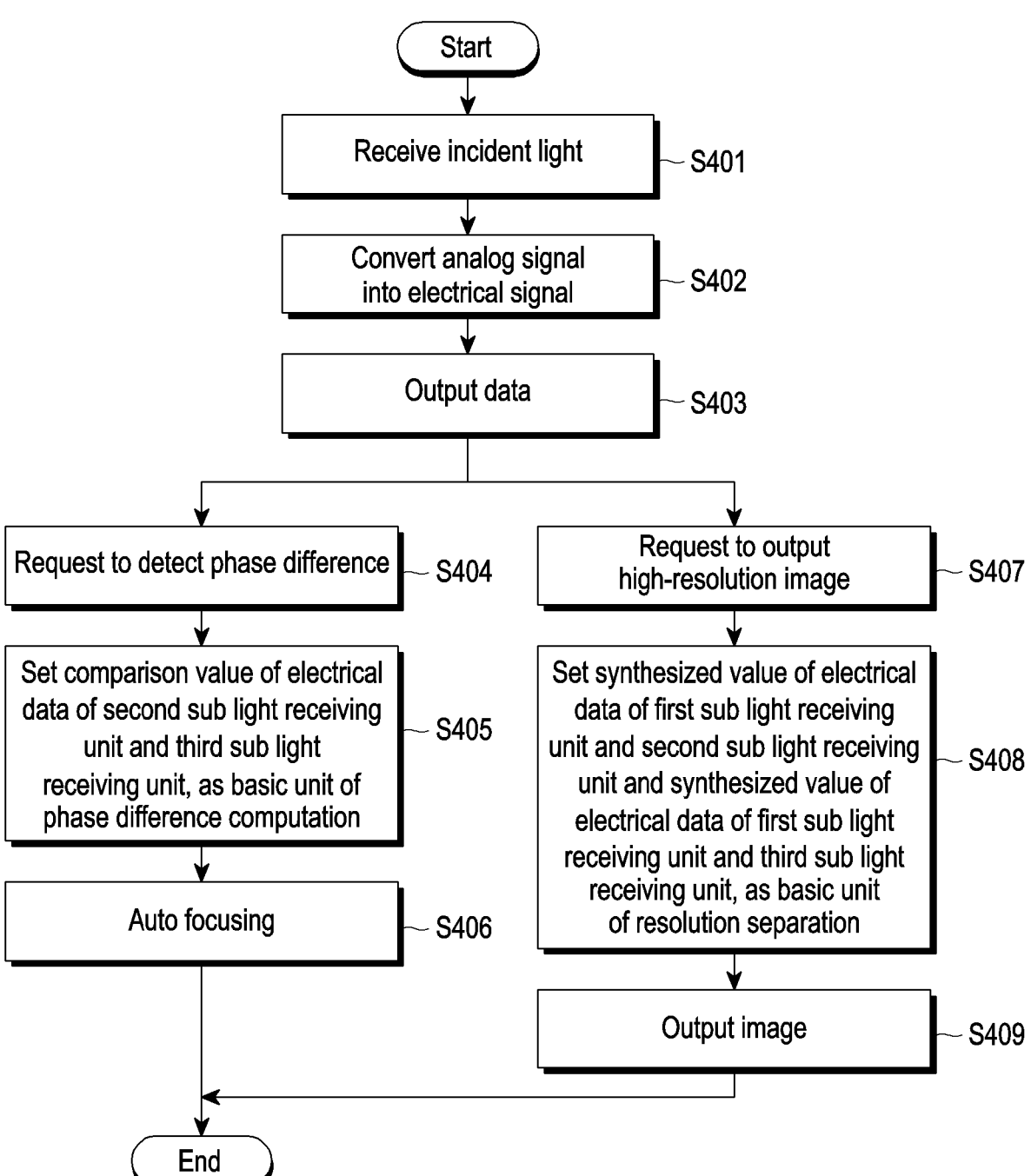
FIG. 18 is a block diagram illustrating a method for controlling an electronic device according to an embodiment of the disclosure.

FIG. 18 is a block diagram illustrating a method for controlling an electronic device according to an embodiment of the disclosure.

A control method according to various embodiments of the disclosure targets an electronic device (e.g., the electronic device 200 of FIG. 2) including a camera module including an image sensor (e.g., the image sensor 300 of FIG. 3) including a main lens and a plurality of micro lenses and a plurality of light receiving elements and a data computation portion (e.g., the data computation portion 340 of FIG. 3) and may operate while separating the area where electrical data for the plurality of light receiving elements is used, differently at the request of phase difference detection and at the request of image output.

As the control method, at the request of phase difference detection, computation may be performed using electrical data for the surrounding elements (e.g., the second sub light receiving portion 330L and the third sub light receiving portion 330R of FIGS. 11A and 11B) of the central element among the plurality of light receiving elements, with the electrical data for the central element (e.g., the first sub light receiving portion 330M of FIGS. 11A and 11B) excluded. As the control method, at the request of image output, computation may be performed using a synthesized value of the electrical data for the central element (e.g., the first sub light receiving portion 330M of FIG. 13) among the plurality of light receiving elements and the electrical data for the surrounding elements (e.g., the second sub light receiving portion 330L and the third sub light receiving portion 330R of FIG. 13) among the plurality of light receiving elements.

Here, the image sensor (e.g., the image sensor 300 of FIG. 3) may include a unit pixel (e.g., the unit pixel 302 of FIG. 1) including a micro lens, a color filter, and at least three light receiving elements per micro lens.

The unit pixel (e.g., the unit pixel 302 of FIG. 10) may include a first sub light receiving portion (e.g., the first sub light receiving portion 330M of FIGS. 11A and 11B) which is a light receiving element receiving a first light of incident light, a second sub light receiving portion (e.g., the second sub light receiving portion 330L of FIGS. 11A and 11B) which is a light receiving element disposed side by side with the first sub light receiving portion in a first direction and receiving a second light adjacent to the first light of the incident light, and a third sub light receiving portion (e.g., the third sub light receiving portion 330R of FIGS. 11A and 11B) which is a light receiving element disposed in a direction opposite to the first direction with respect to the first sub light receiving portion and receiving a third light adjacent to the first light of the incident light.

Referring to FIG. 18, in relation to operation S401 and S402, if incident light is received by the unit pixel, the image sensor 300 may convert the analog signal by the intensity of light into electrical data. In relation to operation S403, the image sensor 300 outputs such electrical data. According to various embodiments of the disclosure, it may be operated differently depending on whether the output electrical data is used for phase difference detection or for image output.

For example, in relation to operation S404 and S405, at the request of phase difference detection, the data computation portion (e.g., the data computation portion 340 of FIG. 3) may set, as a basic unit of phase difference computation, a comparison value of the electrical data of the second sub light receiving portion (e.g., the second sub light receiving portion 330L of FIGS. 11A and 11B) and the electrical data of the third sub light receiving portion (e.g., the third sub light receiving portion 330R of FIGS. 11A and 11B). In relation to operation S406, according to an embodiment of the disclosure, the detected result value of phase difference computation may be used for phase difference auto focusing (AF). Or, the detected result value of phase difference computation may be used for outputting a 3D model using depth information.

In relation to operation S407 and S408, at the request of image output, the data computation portion (e.g., the data computation portion 340 of FIG. 3) may set, as a basic unit of resolution separation, a synthesized value of the electrical data of the first sub light receiving portion (e.g., the first sub light receiving portion 330M of FIG. 13) and the electrical data of the second sub light receiving portion (e.g., the second sub light receiving portion 330L of FIG. 13) and a synthesized value of the electrical data of the first sub light receiving portion (e.g., the first sub light receiving portion 330M of FIG. 13) and the electrical data of the third sub light receiving portion (e.g., the third sub light receiving portion 330R of FIG. 13). In relation to operation S409, according to an embodiment of the disclosure, for an electronic device including a plurality of light receiving elements for each micro lens, it is possible to output an image with high resolution by performing an image output according to remosaic, and it is also possible to output an image with high resolution and resolving power by separating the resolution using synthesized values of the electrical data for at least two light receiving elements adjacent to each other among the plurality of light receiving elements.

Meanwhile, according to an embodiment of the disclosure, the AF operation according to the phase difference detection operation of operations S404 to S406 and the image output operation of operations S407 to S409 may be performed together. For example, high-resolution image output may be performed while performing an AF operation according to the phase difference detection operation of operations S404 to S406. For example, image data output may be performed using the first sub light receiving portion (the first sub light receiving portion 330M of FIG. 13) while simultaneously performing phase difference detection and AF based thereon, using the second sub light receiving portion (e.g., the second sub light receiving portion 330L of FIG. 13) and the third sub light receiving portion (e.g., the third sub light receiving portion 330R of FIG. 13).

According to another embodiment of the disclosure, image output may be auxiliary performed while performing the phase difference detection operation of operations S404 to S406 and the AF operation. In this case, a high-resolution image may be output during the phase difference detection operation, but a preview image may be output as well. For example, the phase difference detection operation and AF operation based thereon may be performed using the B1 area including P1, P4, and P7 and the B3 area including the light receiving elements P3, P6, and P9, with respect to the 9PD pixel of FIG. 10. In this case, it is possible to output a high-resolution image by performing remosaic using all of the nine light receiving elements P1 to P9 or to output a preview image using only the light receiving element P5, as an auxiliary image output method. Further, other various embodiments may be applied in relation to auxiliary performing image output.

According to another embodiment of the disclosure, the phase difference detection operation and the AF operation based thereon may be auxiliary performed while performing the image output operation of operations S407 to S409. For example, with respect to the 9PD pixel of FIG. 10, the phase difference detection operation and the AF operation based thereon may be performed using the B1 area including P1, P4, and P7 and the B3 area including the light receiving elements P3, P6, and P9. In this case, as an auxiliary phase difference detection method, it is also possible to perform a phase difference detection operation using the B1 area including P1, P4, and P7 and the B3 area including the light receiving elements P3, P6, and P9. However, the disclosure is not necessarily limited thereto, and other various embodiments may be applied in relation to the AF operation. For example, with respect to the high-resolution image output operation of operations S407 to S409, the phase difference detection and AF operation based thereon according to operations S404 to S406 may be auxiliary performed. However, the disclosure is not necessarily limited thereto, and the AF operation may be performed using the same contrast AF method, TOF, laser AF, or stereo camera, with respect to the high-resolution image output operation of operations S407 to S409.

Meanwhile, the electronic device may further include a processor (e.g., the processor 260 of FIG. 2). When the diaphragm exposure mode is implemented, the processor may implement the diaphragm exposure mode using electrical data including at least the first sub light receiving portion (e.g., the first sub light receiving portion 330M of FIGS. 17A and 17B) among the plurality of sub light receiving portions. In this case, the function of the diaphragm may be implemented even without a mechanical configuration of the diaphragm by receiving incident light using only electrical data for the central element (e.g., the first sub light receiving portion 330M of FIGS. 17A and 17B), except for electrical data for surrounding elements (e.g., the second sub light receiving portion 330L and the third sub light receiving portion 330R of FIGS. 11A and 11B) of the central element of the plurality of light receiving elements.

Further, according to various embodiments of the disclosure, the electronic device may implement a bokeh function of the camera using electrical data including at least the second sub light receiving portion and a third sub light receiving portion (e.g., the second sub light receiving portion 330L and the third sub light receiving portion 330R of FIGS. 11A and 11B) among the plurality of sub light receiving portions.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. Some of the plurality of entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

According to various embodiments of the disclosure, there may be provided an electronic device (e.g., the electronic device 101 of FIG. 1 or the electronic device 200 of FIG. 2) including at least one camera module (e.g., the camera module 180 of FIG. 1 or the image capture unit 210 of FIG. 2), comprising a lens portion (e.g., the lens portion 211 of FIG. 2) and an imaging element unit (e.g., the imaging sensor 300 of FIG. 3) image-forming a luminous flux passing through the lens portion and capable of converting into a digital signal, wherein the imaging element unit includes a micro lens array portion (e.g., the micro lens array portion 310 of FIG. 3) including a plurality of micro lenses regularly arranged and capable of image-forming some luminous flux included in the luminous flux on a specific light receiving element, a color filter array portion (e.g., the color filter array portion 320 of FIG. 3) including a plurality of colors of one or more types spatially separated and capable of selectively transmitting a wavelength of the luminous flux, a light receiving portion (e.g., the light receiving portion 330 of FIG. 3) including a plurality of light receiving elements converting light of a wavelength selectively incident from the color filter array portion into an electrical signal, and a data computation portion (e.g., the data computation portion 340 of FIG. 4) computing the electrical signal of the light receiving portion, wherein one color filter corresponds to one micro lens (e.g., the micro lens 311 of FIG. 1), and a plurality of sub light receiving portions (e.g., the plurality of sub light receiving portions B1, B2, and B3 of FIG. 10) correspond to the one micro lens, and wherein the plurality of sub light receiving portions include a first sub light receiving portion (e.g., the first sub light receiving portion B2 of FIG. 10 (or the first sub light receiving portion 330M of FIG. 12)) receiving a first light of incident light, a second sub light receiving portion (e.g., the second sub light receiving portion B1 of FIG. 10 (or the second sub light receiving portion 330L of FIG. 12)) disposed side by side with the first sub light receiving portion in a first direction and receiving a second light adjacent to the first light of the incident light, and a third sub light receiving portion (e.g., the third sub light receiving portion B3 of FIG. 10 (or the third sub light receiving portion 330R of FIG. 12)) disposed in a direction opposite to the first direction with respect to the first light receiving portion and receiving a third light adjacent to the first light of the incident light.

According to various embodiments of the disclosure, at a request for detecting a phase difference, the data computation portion may set a value of comparison between electrical data of the second sub light receiving portion and electrical data of the third sub light receiving portion as a basic unit of phase difference computation.

According to various embodiments of the disclosure, a 3D model using auto focusing or depth information may be output through the detected phase difference information.

According to various embodiments of the disclosure, at a request for outputting an image, the data computation portion may set a synthesized value of electrical data of the first sub light receiving portion and electrical data of the second sub light receiving portion and a synthesized value of the electrical data of the first sub light receiving portion and electrical data of the third sub light receiving portion as a basic unit of resolution separation.

According to various embodiments of the disclosure, the synthesized value of the electrical data of the first sub light receiving portion and the electrical data of the second sub light receiving portion and the synthesized value of the electrical data of the first sub light receiving portion and the electrical data of the third sub light receiving portion may be a result value for synthesizing analog signals before computation by the data computation portion or a result value for synthesizing digital signals by the data computation portion.

According to various embodiments of the disclosure, the plurality of sub light receiving portions may further include at least one sub light receiving portion in the first direction includes X sub light receiving portions. (where X is a natural number of 4 or more.)

According to various embodiments of the disclosure, the plurality of sub light receiving portions may further include at least one sub light receiving portion in a second direction perpendicular to the first direction.

According to various embodiments of the disclosure, the plurality of sub light receiving portions may further include at least two sub light receiving portions in the second direction includes sub light receiving portions. (where Y is a natural number of 3 or more.)

According to various embodiments of the disclosure, an exposure mode of a diaphragm may be implemented using electrical data including, at least, the first sub light receiving portion among the plurality of sub light receiving portions.

According to various embodiments of the disclosure, an image having a different bokeh may be output using the second sub light receiving portion or the third sub light receiving portion.

According to various embodiments of the disclosure, there may be provided a method for controlling an electronic device including an image sensor including a main lens and a plurality of micro lenses and a plurality of light receiving elements and a data computation portion, comprising performing computation using electrical data for a surrounding element of a central element among the plurality of light receiving elements except for electrical data for the central element, at a request for detecting a phase difference and performing computation using a synthesized value of the electrical data for the central element among the plurality of light receiving elements and the electrical data for the surrounding element among the plurality of light receiving elements, at a request for outputting an image.

According to various embodiments of the disclosure, the image sensor may include a unit pixel including a micro lens, a color filter, and at least three light receiving elements per micro lens. The unit pixel may include a first sub light receiving portion as a light receiving element receiving a first light of incident light, a second sub light receiving portion as a light receiving element disposed side by side with the first sub light receiving portion in a first direction and receiving a second light adjacent to the first light of the incident light, and a third sub light receiving portion as a light receiving element disposed in a direction opposite to the first direction with respect to the first sub light receiving portion and receiving a third light adjacent to the first light of the incident light.

According to various embodiments of the disclosure, at a request for detecting a phase difference, the data computation portion may set a value of comparison between electrical data of the second sub light receiving portion and electrical data of the third sub light receiving portion as a basic unit of phase difference computation.

According to various embodiments of the disclosure, at a request for outputting an image, the data computation portion may set a synthesized value of electrical data of the first sub light receiving portion and electrical data of the second sub light receiving portion and a synthesized value of the electrical data of the first sub light receiving portion and electrical data of the third sub light receiving portion as a basic unit of resolution separation.

According to various embodiments of the disclosure, the electronic device may further include a processor. When implementing an exposure mode of a diaphragm, the processor may implement the exposure mode of the diaphragm using electrical data including, at least, the first sub light receiving portion among the plurality of sub light receiving portions.

According to various embodiments of the disclosure, there may be provided an electronic device comprising at least one camera module, a lens portion, an image sensor including a plurality of pixels and capable of image-forming light passing through the lens portion and converting into a digital signal, and a data computation portion, wherein at least one of the plurality of pixels includes a micro lens, a color filter, a first light receiving element receiving a first light of incident light, a second light receiving element disposed side by side with the first light receiving element in a first direction and receiving a second light adjacent to the first light of the incident light, and a third light receiving element disposed in a direction opposite to the first direction with respect to the first light receiving element and receiving a third light adjacent to the first light of the incident light.

According to various embodiments of the disclosure, at a request for detecting a phase difference, the data computation portion may set a value of comparison between electrical data of the second light receiving element and electrical data of the third light receiving element as a basic unit of phase difference computation.

According to various embodiments of the disclosure, a 3D model using auto focusing or depth information may be output through the detected phase difference information.

According to various embodiments of the disclosure, at a request for outputting an image, the data computation portion may set a synthesized value of electrical data of the first light receiving element and electrical data of the second light receiving element and a synthesized value of the electrical data of the first light receiving element and electrical data of the third light receiving element as a basic unit of resolution separation.

According to various embodiments of the disclosure, an exposure mode of a diaphragm may be implemented using electrical data including at least the first light receiving element among the plurality of light receiving elements.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device including at least one camera module, the electronic device comprising:
   a lens portion;
   an image sensor configured to convert light passing through the lens portion into a digital signal; and
   a data computation portion,
   wherein the image sensor includes:
      a micro lens array portion including a plurality of micro lenses regularly arranged and configured to focus at least a portion of the light on a specific light receiving element,
      a color filter array portion including one or more types of multiple colors spatially separated and capable of selectively transmitting the light, and
      a light receiving portion including a plurality of light receiving elements converting incident light, selectively incident from the color filter array portion, into an electrical signal,
   wherein one micro lens corresponds to one color filter, and the one micro lens corresponds to a plurality of sub light receiving portions including at least three light receiving elements, and
   wherein the plurality of sub light receiving portions include:
      a first sub light receiving portion receiving a first light of the incident light,
      a second sub light receiving portion disposed side by side with the first sub light receiving portion in a first direction and receiving a second light adjacent to the first light of the incident light, and
      a third sub light receiving portion disposed in a direction opposite to the first direction with respect to the first sub light receiving portion and receiving a third light adjacent to the first light of the incident light, wherein, when outputting an image is requested, the data computation portion sets a synthesized value of electrical data of the first sub light receiving portion and electrical data of the second sub light receiving portion and a synthesized value of the electrical data of the first sub light receiving portion and electrical data of the third sub light receiving portion as a basic unit of resolution separation.

2. The electronic device of claim 1, wherein, when detecting a phase difference is requested, the data computation portion sets a value of comparison between electrical data of the second sub light receiving portion and electrical data of the third sub light receiving portion as a basic unit of phase difference computation.

3. The electronic device of claim 2, wherein a three-dimensional (3D) model using auto focusing (AF) or depth information is output through the detected phase difference.

4. The electronic device of claim 1, wherein the synthesized value of the electrical data of the first sub light receiving portion and the electrical data of the second sub light receiving portion and the synthesized value of the electrical data of the first sub light receiving portion and the electrical data of the third sub light receiving portion is a result value for synthesizing analog signals before computation by the data computation portion or a result value for synthesizing digital signals by the data computation portion.

5. The electronic device of claim 1,
wherein the plurality of sub light receiving portions further includes at least one sub light receiving portion in the first direction includes X sub light receiving portions, and
wherein X is a natural number of 4 or more.

6. The electronic device of claim 1, wherein the plurality of sub light receiving portions further include at least one sub light receiving portion in a second direction perpendicular to the first direction.

7. The electronic device of claim 6,
wherein the plurality of sub light receiving portions further include at least two sub light receiving portions in the second direction includes sub light receiving portions, and wherein Y is a natural number of 3 or more.

8. The electronic device of claim 1, wherein an exposure mode of a diaphragm is implemented using electrical data including, at least, the first sub light receiving portion among the plurality of sub light receiving portions.

9. The electronic device of claim 1, wherein an image having a different bokeh is output using the second sub light receiving portion or the third sub light receiving portion.

10. A method for controlling an electronic device including a camera module including an image sensor including a main lens and a plurality of micro lenses and a plurality of light receiving elements and a data computation portion, wherein the image sensor includes a unit pixel including a micro lens, a color filter, and at least three light receiving elements per micro lens, and wherein the unit pixel includes:
a first sub light receiving portion as a light receiving element receiving a first light of incident light,
a second sub light receiving portion as a light receiving element disposed side by side with the first sub light receiving portion in a first direction and receiving a second light adjacent to the first light of the incident light, and
a third sub light receiving portion as a light receiving element disposed in a direction opposite to the first direction with respect to the first sub light receiving portion and receiving a third light adjacent to the first light of the incident light, the method comprising:
performing computation using electrical data for a surrounding element of a central element among the plurality of light receiving elements except for electrical data for the central element, at a request for detecting a phase difference; and
performing computation using a synthesized value of the electrical data for the central element among the plurality of light receiving elements and the electrical data for the surrounding element among the plurality of light receiving elements, at a request for outputting an image.

11. The method of claim 10, wherein at the request for detecting the phase difference, the data computation portion sets a value of comparison between electrical data of the second sub light receiving portion and electrical data of the third sub light receiving portion as a basic unit of phase difference computation.

12. The method of claim 10, wherein at the request for outputting the image, the data computation portion sets a synthesized value of electrical data of the first sub light receiving portion and electrical data of the second sub light receiving portion and a synthesized value of the electrical data of the first sub light receiving portion and electrical data of the third sub light receiving portion as a basic unit of resolution separation.

13. The method of claim 10,
wherein the electronic device further includes a processor, and
wherein, when implementing an exposure mode of a diaphragm, the processor implements the exposure mode of the diaphragm using electrical data including, at least, the first sub light receiving portion among a plurality of sub light receiving portions.

14. The method of claim 12, wherein the synthesized value of the electrical data of the first sub light receiving portion and the electrical data of the second sub light receiving portion and the synthesized value of the electrical data of the first sub light receiving portion and the electrical data of the third sub light receiving portion is a result value for synthesizing analog signals before computation by the data computation portion or a result value for synthesizing digital signals by the data computation portion.

15. The method of claim 10, further comprising:
implementing an exposure mode of a diaphragm using electrical data including, at least, the first sub light receiving portion among a plurality of sub light receiving portions.

16. The method of claim 10, further comprising:
outputting an image having a different bokeh using the second sub light receiving portion or the third sub light receiving portion.

17. One or more non-transitory computer-readable storage media storing computer-executable instructions that, when executed by one or more processors of an electronic device, cause the electronic device to perform operations, the operations comprising:
performing computation using electrical data for a surrounding element of a central element among a plurality of light receiving elements except for electrical data for the central element, at a request for detecting a phase difference; and
performing computation using a synthesized value of the electrical data for the central element among the plurality of light receiving elements and the electrical data for the surrounding element among the plurality of light receiving elements, at a request for outputting an image, wherein at the request for outputting the image, data computation portion sets a synthesized value of electrical data of a first sub light receiving portion and electrical data of a second sub light receiving portion and a synthesized value of the electrical data of the first sub light receiving portion and electrical data of a third sub light receiving portion as a basic unit of resolution separation.

\* \* \* \* \*